(12) United States Patent
Gregoire et al.

(10) Patent No.: US 11,429,259 B2
(45) Date of Patent: Aug. 30, 2022

(54) SYSTEM AND METHOD FOR SELECTING AND EDITING HANDWRITING INPUT ELEMENTS

(71) Applicant: MyScript, Nantes (FR)

(72) Inventors: Gilles Gregoire, Saint Herblain (FR); Baptiste Demarest, Nantes (FR)

(73) Assignee: MyScript, Nantes (FR)

( * ) Notice: Subject to any disclaimer, the term of this patent is extended or adjusted under 35 U.S.C. 154(b) by 72 days.

(21) Appl. No.: 16/715,969

(22) Filed: Dec. 16, 2019

(65) Prior Publication Data

US 2020/0356768 A1 Nov. 12, 2020

(30) Foreign Application Priority Data

May 10, 2019 (EP) .................................... 19173816

(51) Int. Cl.
| | | |
|---|---|---|
| G06F 3/04842 | (2022.01) | |
| G06F 40/166 | (2020.01) | |
| G06F 3/01 | (2006.01) | |
| G06F 3/04883 | (2022.01) | |
| G06V 30/142 | (2022.01) | |

(52) U.S. Cl.
CPC .......... *G06F 3/04842* (2013.01); *G06F 3/017* (2013.01); *G06F 3/04883* (2013.01); *G06F 40/166* (2020.01); *G06V 30/1423* (2022.01); *G06T 2200/24* (2013.01)

(58) Field of Classification Search
CPC ................ G06K 9/00436; G06K 9/222; G06F 3/04842; G06F 40/166; G06F 3/017; G06F 3/04883; G06T 2200/24; G06V 30/1423
See application file for complete search history.

(56) References Cited

U.S. PATENT DOCUMENTS

| | | |
|---|---|---|
| 5,847,712 A | 12/1998 | Salesin |
| 5,867,596 A | 2/1999 | Kano et al. |
| 5,880,743 A * | 3/1999 | Moran .................... G06T 13/80 715/201 |
| 6,525,749 B1 | 2/2003 | Moran et al. |
| 6,647,145 B1 | 11/2003 | Gay |
| 7,218,779 B2 | 5/2007 | Dodge |

(Continued)

FOREIGN PATENT DOCUMENTS

EP 0667567 A2 8/1995

OTHER PUBLICATIONS

European Patent Office—Extended European Search Report dated Nov. 25, 2019 for related European Appln. No. 19173816.0—9 pgs.

*Primary Examiner* — Justin R. Blaufeld
(74) *Attorney, Agent, or Firm* — McDermott Will and Emery LLP

(57) ABSTRACT

The invention relates to a method in a computing device for hand-drawing elements, comprising: detecting input elements hand-drawn on an input surface; displaying the input elements in digital ink on a display device; classifying input digital ink as text or non-text and predefining blocks of input elements; selecting one or more input element according to a first selection mode triggered by a first gesture or according to a second selection mode triggered by a second gesture to select input elements within a selection area. Once selection is made, editing may be performed on the selected input elements in a different manner depending of which of the first and second selection mode is used.

11 Claims, 8 Drawing Sheets

(56) References Cited

U.S. PATENT DOCUMENTS

| | | |
|---|---|---|
| 7,298,903 B2 | 11/2007 | Wang et al. |
| 7,324,691 B2 | 1/2008 | Li et al. |
| 7,330,184 B2 | 2/2008 | Leung |
| 7,352,902 B2 | 4/2008 | Li et al. |
| 7,394,935 B2 | 7/2008 | Chen et al. |
| 7,440,616 B2 | 10/2008 | Li et al. |
| 7,496,232 B2 | 2/2009 | Bishop et al. |
| 7,616,333 B2 | 11/2009 | Wakeam et al. |
| 7,904,810 B2 | 3/2011 | Chen et al. |
| 7,945,097 B2 | 5/2011 | Biswas et al. |
| 8,014,607 B2 | 9/2011 | Saund et al. |
| 8,316,299 B2 | 11/2012 | Asaka |
| 8,718,375 B2 | 5/2014 | Ouyang et al. |
| 8,782,549 B2 | 7/2014 | Quyang |
| 9,171,204 B2 | 10/2015 | Acharya |
| 10,048,824 B2 | 8/2018 | Jung |
| 10,996,843 B2 * | 5/2021 | Durandet ............... G06V 30/32 |
| 2003/0007683 A1 | 1/2003 | Wang |
| 2003/0215145 A1 | 11/2003 | Shilman et al. |
| 2004/0021701 A1 * | 2/2004 | Iwema ................. G06F 3/0481 715/863 |
| 2004/0155869 A1 | 8/2004 | Robinson |
| 2004/0252888 A1 | 12/2004 | Bargeron |
| 2005/0063592 A1 | 3/2005 | Li et al. |
| 2005/0063594 A1 | 3/2005 | Li et al. |
| 2006/0061780 A1 * | 3/2006 | Chen .................... G06F 3/0488 358/1.8 |
| 2006/0098871 A1 | 5/2006 | Szummer |
| 2006/0210173 A1 | 9/2006 | Jurion |
| 2006/0218171 A1 | 9/2006 | Wakeman et al. |
| 2008/0195931 A1 | 8/2008 | Raghupathy |
| 2008/0232690 A1 | 9/2008 | Saund et al. |
| 2011/0138284 A1 * | 6/2011 | Wigdor .................. G06F 3/167 345/173 |
| 2014/0177962 A1 | 6/2014 | Torgerson |
| 2014/0313216 A1 | 10/2014 | Steingrimsson |
| 2014/0325435 A1 | 10/2014 | Jung |
| 2015/0206005 A1 | 7/2015 | Jung |
| 2017/0068868 A1 | 3/2017 | Cartune |
| 2017/0109578 A1 | 4/2017 | Bednarowicz |
| 2018/0067640 A1 * | 3/2018 | Jiang .................... G06F 40/171 |

* cited by examiner

SYSTEM AND METHOD FOR SELECTING AND EDITING HANDWRITING INPUT ELEMENTS

CROSS REFERENCE TO RELATED APPLICATIONS

This application claims priority to European Application No. 19173816.0, filed on May 10, 2019, the entire contents of which is incorporated herein.

TECHNICAL FIELD

The present disclosure relates generally to the field of computing device interface capable of recognizing user input handwriting of various graphics and text. In particular, the present disclosure concerns computing devices and corresponding methods for detecting and processing input handwritten elements.

BACKGROUND

Computing devices continue to become more ubiquitous to daily life. They may take various forms such as computer desktops, laptops, tablet PCs, hybrid computers (2-in-1s), e-book readers, mobile phones, smartphones, wearable computers (including smartwatches, smart glasses/headsets), global positioning system (GPS) units, enterprise digital assistants (EDAs), personal digital assistants (PDAs), game consoles, and the like. Further, computing devices are being incorporated into vehicles and equipment, such as cars, trucks, farm equipment, manufacturing equipment, building environment control (e.g., lighting, HVAC), and home and commercial appliances.

Each type of computing device is equipped with particular computing resources and destined for given uses. Computing devices generally comprise of at least one processing element, such as a central processing unit (CPU), some form of memory, and input and output devices. The variety of computing devices and their subsequent uses necessitate a variety of input devices and interfaces to allow users to interact with their computing devices.

One such input device is a touch sensitive surface such as a touchscreen or touchpad wherein the user input is received through contact between a user body part (e.g. a finger) or an instrument (e.g. a pen or stylus), and the touch sensitive surface. Another input device is an input surface that senses gestures made by a user above the input surface. A further input device is a position detection system which detects the relative position of either touch or non-touch interactions with a non-touch physical or virtual surface.

Handwriting recognition can be implemented in computing devices to input and process various types of input elements hand-drawn or handwritten by a user, such as text content (e.g., alphanumeric characters) or non-text content (e.g. shapes, drawings). Once inputted on a computing device, the input elements are usually displayed as digital ink and undergo handwriting recognition to be converted into typeset versions. The user handwriting input is typically interpreted using a real-time handwriting recognition system or method. To this end, either on-line systems (recognition carried out using a cloud-based solution or the like) or off-line systems may be used.

The user input may be diagrams or any other content of text, non-text or mixed content of text and non-text. Handwriting input may be made on a structured document according to guiding lines (or base lines) which guide and constraint input by the user. Alternatively, a user may handwrite in free-mode, i.e. without any constraints of lines to follow or input size to comply with (e.g. on a blank page).

FIG. 1A shows an example of a computing device 1 comprising a display device 1 which displays ink input elements hand-drawn or handwritten by a user using an appropriate user interface. In the present case, the computing device 1 detects and displays text content 4 and 6 and non-text content 8, 10 and 12. Each of these elements is formed by one or more strokes of digital ink. As discussed later, text and non-text may each take various forms. Input elements may comprise text handwriting, diagrams, musical annotations, and so on . . . . In this example, the shape 8 is a rectangle or the like which constitutes a container (a box) containing text content 6 so that both elements 6 and 8 can be selected and manipulated together.

As mentioned earlier, handwriting recognition may be performed on text input elements. Handwriting recognition may also be performed on non-text input elements. In addition, each input element may be converted and displayed as typeset input elements, as depicted in this example in FIG. 1B.

The content depicted in FIGS. 1A-1B is a mere example and other elements, or other types or forms thereof, than those depicted may be present in addition to or as an alternative.

In handwriting recognition applications, it is usually possible to perform some level of editing on user input displayed on a computing device. Conventionally, such applications are however limited in their capabilities to handle editing functions and typically constrain users to adopt behaviors or accept compromises which do not reflect the user's original intent. As a result, some conventional handwritten recognition applications force users to navigate menus to select and edit ink elements.

Typically, the ability in conventional handwriting recognition applications to rearrange text or non-text ink input elements is limited where only certain operations are available, often involving complex or unnatural manipulations by the users. As such, it is generally difficult for users to edit text or non-text context in an ergonomic and efficient manner.

U.S. Pat. No. 7,394,935 describes relative manipulations on digital ink with respect to resizing and repositioning operations. However, further improvements on edition manipulations are required to provide more flexibility to the user to edit digital ink in an efficient and user-friendly manner.

SUMMARY

The examples of the present invention that are described herein below provide computing devices, methods and corresponding computer programs for editing of input ink elements.

According to a particular aspect, the invention provides a computing device for hand-drawing elements, comprising: an input surface for hand-drawing input elements including text and non-text elements; a display device for displaying a plurality of said input elements in digital ink, each input element being formed by at least one stroke of digital ink; an analyzer for classifying input digital ink as text or non-text and for predefining blocks, each of at least one input element classified as text or non-text; a selection module operable to function according to the following selection modes to cause selection of at least one input element: a first selection mode triggered by a first gesture with the input surface to select a predefined block; and a second selection mode triggered by a second gesture, different from the first gesture, with the input surface to define a selection area, causing selection of each input element contained at least partially within said selection area irrespective of the blocks predefined by the analyzer; and an edition module for editing the at least one selected input element in a different manner depending on whether the first selection mode or the second selection mode is used.

In a particular embodiment, the first gesture defines a selection position on the display device, wherein in the first mode selection, the selection module is configured to select said predefined block based on the selection position defined by the first gesture.

In a particular embodiment, in the first mode selection, selection of at least one predefined block is made based on the relative position of the selection position with respect to each predefined block displayed on the display device so that the predefined block closest to the selection position is selected.

In a particular embodiment, the first gesture is a tap gesture detected on the input surface.

In a particular embodiment, in the first selection mode, the first gesture is an interaction of a user's body part with the input surface, which is detected without causing generation of a stroke of digital ink on the display device.

In a particular embodiment, in the second selection mode, the second gesture causes generation of a stroke of digital ink on the display device.

In a first variant, the computing device is configured as follows: if a block containing text is selected using the first selection mode, the edition module is configured to perform text reflow upon detection that said block is rescaled during a first edition operation; and if at least one input element containing text is selected using the second selection mode, said at least one input element comprising either a sub-part only of a predefined block or multiple predefined blocks, the edition module is then configured, upon detection that said at least one input element is rescaled during a second edition operation, to move without rescaling each text element of said at least one input element.

In a particular embodiment of this first variant, if at least one input element containing text is selected using the second selection mode, said at least one input element comprising either a sub-part only of a predefined block or multiple predefined blocks, the edition module is then configured, upon detection that said at least one input element is rescaled during the second edition operation, to rescale each non-text input element while moving without rescaling each text element of said at least one input element.

In a second variant, the computing device is configured as follows: if a block containing text is selected using the first selection mode, the edition module is configured to perform text reflow upon detection that said block is rescaled during a first edition operation; and if at least one input element containing text is selected using the second selection mode, said at least one input element comprising either a sub-part only of a predefined block or multiple predefined blocks, the edition module is then configured, upon detection that said at least one input element is rescaled during a second edition operation, to rescale each text element of said at least one input element.

In a particular embodiment, if at least one input element is selected using the second selection mode, the edition module is configured to force editing so that each input element is edited as text.

In a particular embodiment, if at least one input element is selected using the second selection mode, the edition module is configured to force editing so that each input element is edited as non-text.

In a particular embodiment, the disclosure may be implemented using software and/or hardware components. In this context, the term "module" can refer in this document to a software component, as well as a hardware component or a plurality of software and/or hardware components.

The present invention also relates to a method as defined in the present teaching, said method being implemented by a computing device for hand-drawing elements, the computing device comprising a processor, a memory, and at least one non-transitory computer readable medium for recognizing input under control of the processor. As set out earlier, the method may comprise: detecting input elements hand-drawn on an input surface, said input elements including text and non-text elements; displaying on a display device a plurality of said input elements in digital ink, each input element being formed by at least one stroke of digital ink; classifying, using an analyzer, input digital ink as text or non-text, and predefining blocks of at least one input element classified as text or non-text; selecting at least one input element according to any one of the following operable selection modes: a first selection mode triggered by a first gesture with the input surface to select a predefined block; and a second selection mode triggered by a second gesture, different from the first gesture, with the input surface to define a selection area, causing selection of each input element contained at least partially within said selection area irrespective of the blocks predefined by the analyzer; editing the at least one selected input element in a different manner depending on whether the first selection mode or the second selection mode is used.

The various embodiments defined above in connection with the computing device of the present invention apply in an analogous manner to the method, the computer program and the non-transitory computer readable medium of the present disclosure.

For each step of the method of the present invention as described in the present teachings, the computing device may comprise a corresponding module configured to perform said step.

In a particular embodiment, the first gesture defines a selection position on the display device, wherein in the first mode selection, the selection module is configured to select said predefined block based on the selection position defined by the first gesture.

In a particular embodiment, wherein in the first mode selection, selection of at least one predefined block is made based on the relative position of the selection position with respect to each predefined block displayed on the display device so that the predefined block closest to the selection position is selected.

In a particular embodiment, the first gesture is a tap gesture detected on the input surface.

In a particular embodiment, in the first selection mode, the first gesture is an interaction of a user's body part with the input surface which is detected without causing generation of a stroke of digital ink on the display device.

In a particular embodiment, in the second selection mode, the second gesture causes generation of a stroke of digital ink on the display device.

In a first variant, said editing comprises: if a block containing text is selected using the first selection mode, performing text reflow upon detection that said block is rescaled during a first edition operation; and if at least one input element containing text is selected using the second selection mode, said at least one input element comprising either a sub-part only of a predefined block or multiple predefined blocks, moving without rescaling each text element of said at least one input element upon detecting that said at least one input element is rescaled during a second edition operation.

In a particular embodiment of this first variant, said editing comprises: if at least one input element containing text is selected using the second selection mode, said at least one input element comprising either a sub-part only of a predefined block or multiple predefined blocks, rescaling each non-text input element while moving without rescaling each text element of said at least one input element upon detecting that said at least one input element is rescaled during the second edition operation.

In a second variant, said editing comprises: if a block containing text is selected using the first selection mode, the edition module is configured to perform text reflow upon detection that said block is rescaled during a first edition operation; and if at least one input element containing text is selected using the second selection mode, said at least one input element comprising either a sub-part only of a predefined block or multiple predefined blocks, rescaling each text element of said at least one input element upon detecting that said at least one input element is rescaled during a second edition operation.

In a particular embodiment, said editing comprises: if at least one input element is selected using the second selection mode, forcing editing so that each input element is edited as text.

In a particular embodiment, said editing comprises: if at least one input element is selected using the second selection mode, forcing editing so that each input element is edited as non-text.

According to another aspect, the present inventions relates to a non-transitory computer readable medium having recorded thereon a computer readable program code (or computer program) including instructions for executing the steps of the method of the invention as defined in the present document.

The computer program of the invention can be expressed in any programming language, and can be in the form of source code, object code, or any intermediary code between source code and object code, such that in a partially-compiled form, for instance, or in any other appropriate form.

The invention also provides a computer program as mentioned above.

The non-transitory computer readable medium previously mentioned can be any entity or device capable of storing the computer program. For example, the recording medium can comprise a storing means, such as a ROM memory (a CD-ROM or a ROM implemented in a microelectronic circuit), or a magnetic storing means such as a floppy disk or a hard disk for instance.

The non-transitory computer readable medium of the invention can correspond to a transmittable medium, such as an electrical or an optical signal, which can be conveyed via an electric or an optic cable, or by radio or any other appropriate means. The computer program according to the disclosure can in particular be downloaded from the Internet or a network of the like.

Alternatively, the non-transitory computer readable medium can correspond to an integrated circuit in which a computer program is loaded, the circuit being adapted to execute or to be used in the execution of the methods of the invention.

In a particular embodiment, the invention relates to a non-transitory computer readable medium having a computer readable program code embodied therein, said computer readable program code being adapted to be executed to implement a method for hand-drawing input elements on a computing device as defined in the present document, the computing device comprising a processor for executing the steps of said method.

BRIEF DESCRIPTION OF THE DRAWINGS

Other characteristics and advantages of the present disclosure will appear from the following description made with reference to the accompanying drawings, which show embodiments having no limiting character. In the figures.

Figure 1A:
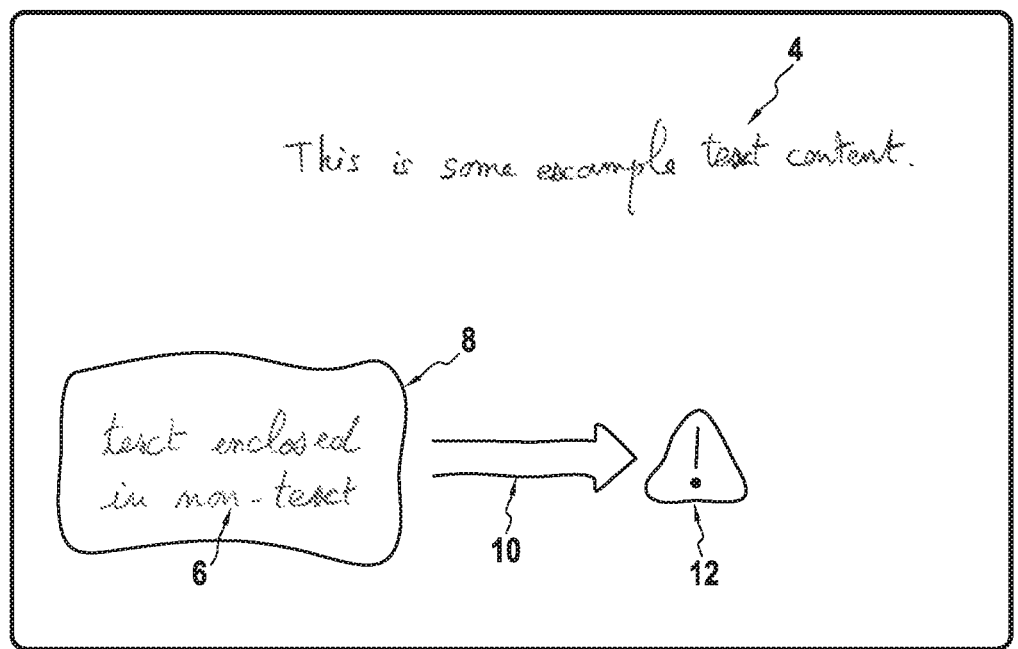
FIGS. 1A-1B represent a digital device according a conventional arrangement.
Figure 1B:
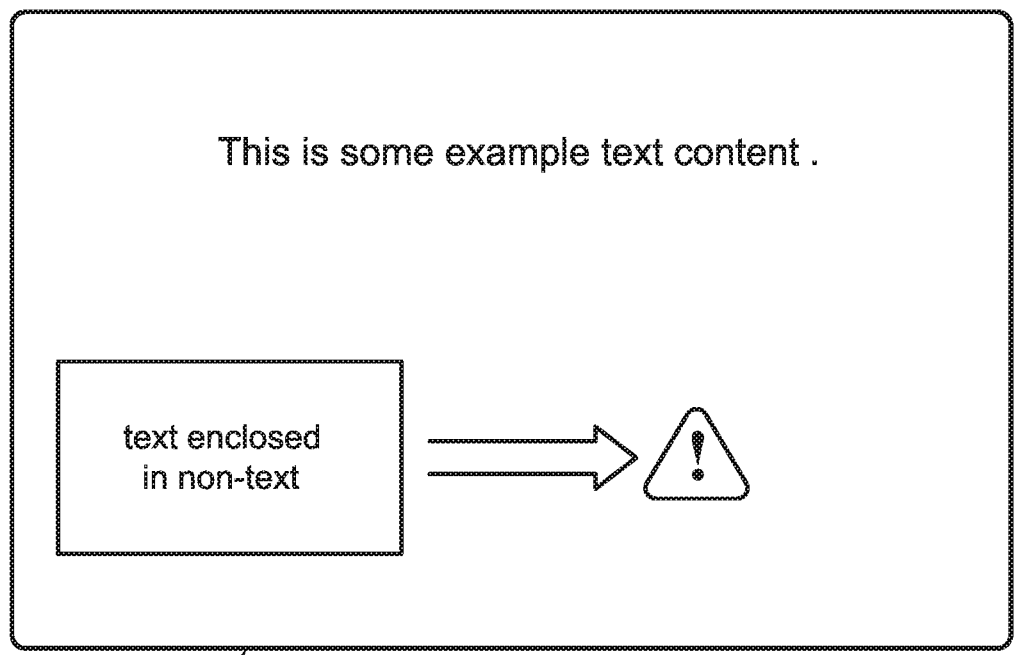

The components in the figures are not necessarily to scale, emphasis instead being placed upon illustrating the principles of the present invention.

For simplicity and clarity of illustration, the same reference numerals will be used throughout the figures to refer to the same or analogous parts, unless indicated otherwise.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known method, procedures, and/or components are described at a relatively high-level, without detail, in order to avoid unnecessarily obscuring aspects of the present teachings.

The following description of the exemplary embodiments refers to the accompanying drawings. The following detailed description does not limit the invention. Instead, the scope of the invention is defined by the appended claims. In various embodiments as illustrated in the figures, a computing device, a corresponding method and a corresponding computer program are discussed.

Reference to and discussion of directional features such as up, down, above, below, lowest, highest, horizontal, vertical, etc. are made with respect to the Cartesian coordinate system as applied to the input surface on which the input to be detected and processed is made. Further, terms such as left and right are made in relation to the reader's frame of reference when viewing the drawings.

Further, the use of the term "text" in the present description is understood as encompassing all alphanumeric characters, and strings thereof, in any written language and common place non-alphanumeric characters, e.g. symbols, used in written text.

Further still, the term "non-text" in the present description is understood as encompassing freeform handwritten or hand-drawn content (shapes, drawings . . . ) and image data, as well as non-alphanumeric characters, and string thereof, which are used in non-text contexts. Non-text content defines graphic or geometric formations in linear or non-linear configurations, including containers, drawings, common shapes (arrows, blocks . . . ) or the like. In diagrams for instance, text content may be contained in a shape (a rectangle, ellipse, oval shape . . . ) called containers.

Furthermore, the examples shown in these drawings are in a left-to-right written language context, and therefore any reference to positions can be adapted for written languages having different directional formats.

The various technologies described herein generally relate to capture, processing and management of hand-drawn and handwritten content on portable and non-portable computing devices. The systems and methods described herein may utilize recognition of user's natural writing and drawing styles input to a computing device via an input surface, such as a touch sensitive screen (as discussed later). Whilst the various embodiments are described with respect to recognition of digital ink handwriting input using so-called online recognition techniques, it is understood that application is possible to other forms of input for recognition, such as offline recognition involving a remote device or server to perform recognition.

The terms "hand-drawing" and "handwriting" are used interchangeably herein to define the creating of digital contents by users through use of their hands (or fingers) or an input device (hand-held stylus or digital pen, mouse . . . ) on or with an input surface. The term "hand" or the like is used herein to provide concise description of the input techniques, however the use of other parts of a user's body for similar input is included in this definition, such as foot, mouth and eye.

As described in more details below, an aspect of the present invention relies on detecting input elements hand-drawn using a computing device, classifying these input elements as text or non-text, selecting at least one of such input elements using one of plural applicable selection modes, and editing the selected input elements in a different specific manner depending on which selection mode is used, thereby providing flexible and efficient editing to the user. Further aspects of the present invention will be described hereafter.

Figure 2:
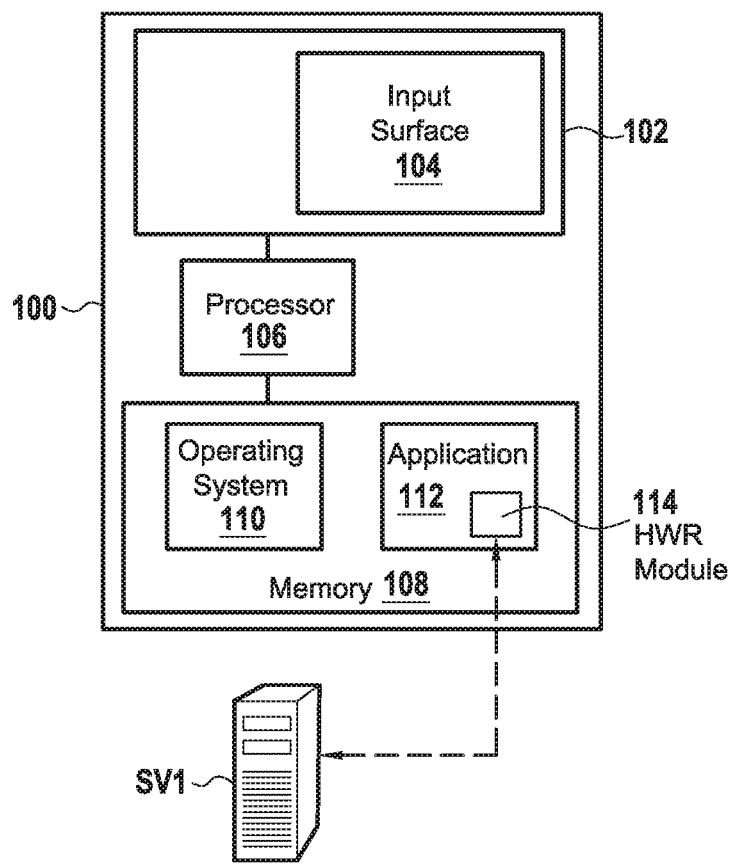
FIG. 2 is a block diagram representing schematically a computing device according to a particular embodiment of the invention.

FIG. 2 shows a block diagram of a computing device 100 according to a particular embodiment of the present invention. The computing device (or digital device) 100 may be a computer desktop, laptop computer, tablet computer, e-book reader, mobile phone, smartphone, wearable computer, digital watch, interactive whiteboard, global positioning system (GPS) unit, enterprise digital assistant (EDA), personal digital assistant (PDA), game console, or the like. The computing device 100 includes components of at least one processing elements, some form of memory and input and output (I/O) devices. The components communicate with each other through inputs and outputs, such as connectors, lines, buses, links networks, or others known to the skilled person.

More specifically, the computing device 100 comprises at least one display device (or display) 102 for outputting data from the computing device such as images, text and video. The display device 102 may be a screen or the like of any appropriate technology (LCD, plasma . . . ). As described further below, the display device 102 is capable of displaying input elements in digital ink, each input element being formed of at least one stroke of digital ink.

The computing device 100 also comprises an input surface 104 for hand-drawing input elements including text and non-text elements, as described further below. The input surface 104 may be co-located with the display device 102 or remotely connected thereto. In a particular example, the display device 102 and the input surface 104 are parts of a touchscreen. The input surface 104 may employ technology such as resistive, surface acoustic wave, capacitive, infrared grid, infrared acrylic projection, optical imaging, dispersive signal technology, acoustic pulse recognition, or any other appropriate technology as known to the skilled person to receive user input in the form of a touch- or proximity-sensitive surface. The input surface 104 may be a non-touch sensitive surface which is monitored by a position detection system.

As depicted in FIG. 2, the computing device 100 further comprises a processor 106 and a memory 108. The computing device 100 may also comprise one or more volatile storing elements (RAM) as part of the memory 108 or separate thereof.

The processor 106 is a hardware device for executing software, particularly software stored in the memory 108. The processor 108 can be any custom made or commercially available general purpose processor, a central processing unit (CPU), a semiconductor based microprocessor (in the form of microchip or chipset), a microcontroller, a digital signal processor (DSP), an application specific integrated circuit (ASIC), field programmable gate array (FPGA) or other programmable logic device, or any combination thereof, and more generally any appropriate processor component designed for executing software instructions as known to the skilled person.

The memory 108 constitutes (or comprises) a non-transitory (or non-volatile) computer readable medium (or recording medium) in accordance with a particular embodiment of the disclosure. The memory 108 may include any combination of non-volatile storing elements (e.g. ROM, EPROM, flash PROM, EEPROM, hard drive, magnetic or optical tape, memory registers, CD-ROM, WORM, DVD, or the like.

The memory 108 may be remote from the computing device 100, such as at a server or cloud-based system, which is remotely accessible by the computing device 100. The non-volatile memory 108 is coupled to the processor 106, so that the processor 106 is capable of reading information from and writing information to the memory 108. As an alternative, the memory 108 is integral to the computing device 100.

The memory 108 includes an operating system (OS) 110 and a handwriting application (or computer program) 112. The operating system 110 controls the execution of the application 112. The application 112 constitutes (or comprises) a computer program (or computer-readable program code) according to a particular embodiment of the invention, this computer program having instructions to implement a method according to a particular embodiment of the invention.

The application 112 may include instructions for detecting and managing ink input elements hand-drawn by a user using the input surface 104 of the computing device 100. As discussed later, these handwritten ink input elements (also called herein ink input elements or input elements) which may be text or non-text, are formed by one or plural strokes of digital ink.

The application 112 may comprise a handwriting recognition (HWR) module (or system) 114 for recognizing handwritten input to the computing device 100, including handwritten text and non-text. The HWR 114 may be a source program, an executable program (object code), script, application, or any other component having a set of instructions to be performed. In the present example depicted in FIG. 2, the application 112 and the HWR module 114 are combined in a single application (the HWR module 114 is part of the application 112). Alternatively, the HWR module 114 may be a module, method or system for communicating with a handwriting recognition system remote from the computing device 100, such as a server (or cloud-based system) SV1 as depicted in FIG. 2 which is remotely accessible by the computing device 100 through an appropriate communication link. The application 112 and the HWR module 114 may also be separate components stored in the memory 108 (or in different memories) of the computing device 100, whereby the application 112 and the HWR module 114 operate together accessing information processed and stored in the memory 108.

As shown later in the figures, strokes entered on or via the input surface 104 are processed by the processor 106 as digital ink. Digital ink is formed by rendering handwritten input in digital image format, in this case on the display device 102.

A user may enter a stroke with a hand or finger, or with some input instrument such as a digital pen or stylus suitable for use with the input surface 104. The user may also enter a stroke by making a gesture above the input surface 104 if means configured to sense motions in the vicinity of the input surface 104 is being used, or with a peripheral device of the computing device 100, such as a mouse or a joystick or the like.

Each ink input element (letters, symbols, words, shape, . . . ) is formed by one or a plurality of such strokes. A stroke is characterised by at least a stroke initiation location (corresponding to a "pen down" event), a stroke terminal location (corresponding to a "pen up" event), and the path connecting the stroke initiation and the stroke terminal locations. Because different users may naturally write or hand-draw a same object (e.g. letter, shape, symbol . . . ) with slight variations, the HWR module 114 accommodates a variety of ways in which each object may be entered whilst being still recognized as the correct or intended object.

Figure 3:
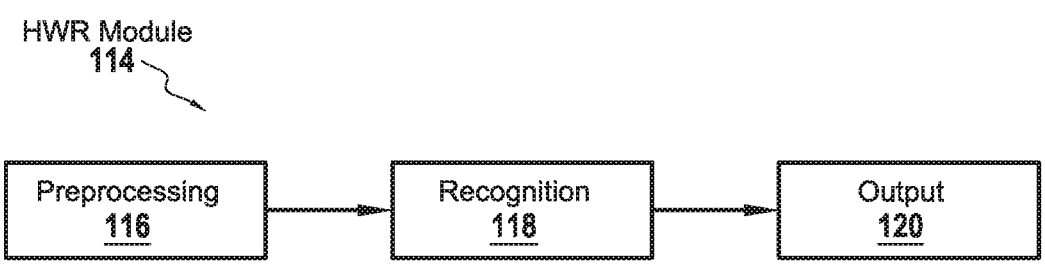
FIGS. 3-4 depict schematically components, and corresponding steps, of the computing device of FIG. 2, according to a particular embodiment of the invention.

FIG. 3 is a schematic diagram of an example of a recognition process performed by the HRW module 114, in either its local (i.e., loaded on the computing device 100) or remote (i.e., remotely accessible by the computing device 100) forms. This recognition process includes stages (or steps) such as preprocessing 116, recognition 118 and output 120.

The preprocessing stage 116 processes the digital ink to achieve greater accuracy and reducing processing time during the recognition stage 118. This preprocessing may include normalizing of the path connecting the stroke initiation and stroke termination locations by applying size normalisation and/or methods such as B-spline approximation to smooth the input.

The preprocessed strokes are then passed to the recognition stage 118 which processes the strokes to recognize the object formed thereby. The recognized objects are then output 120 to the memory 108 and displayed by the display device 102 as digital ink or typeset ink versions of the handwritten input elements (either text or non-text).

Figure 4:
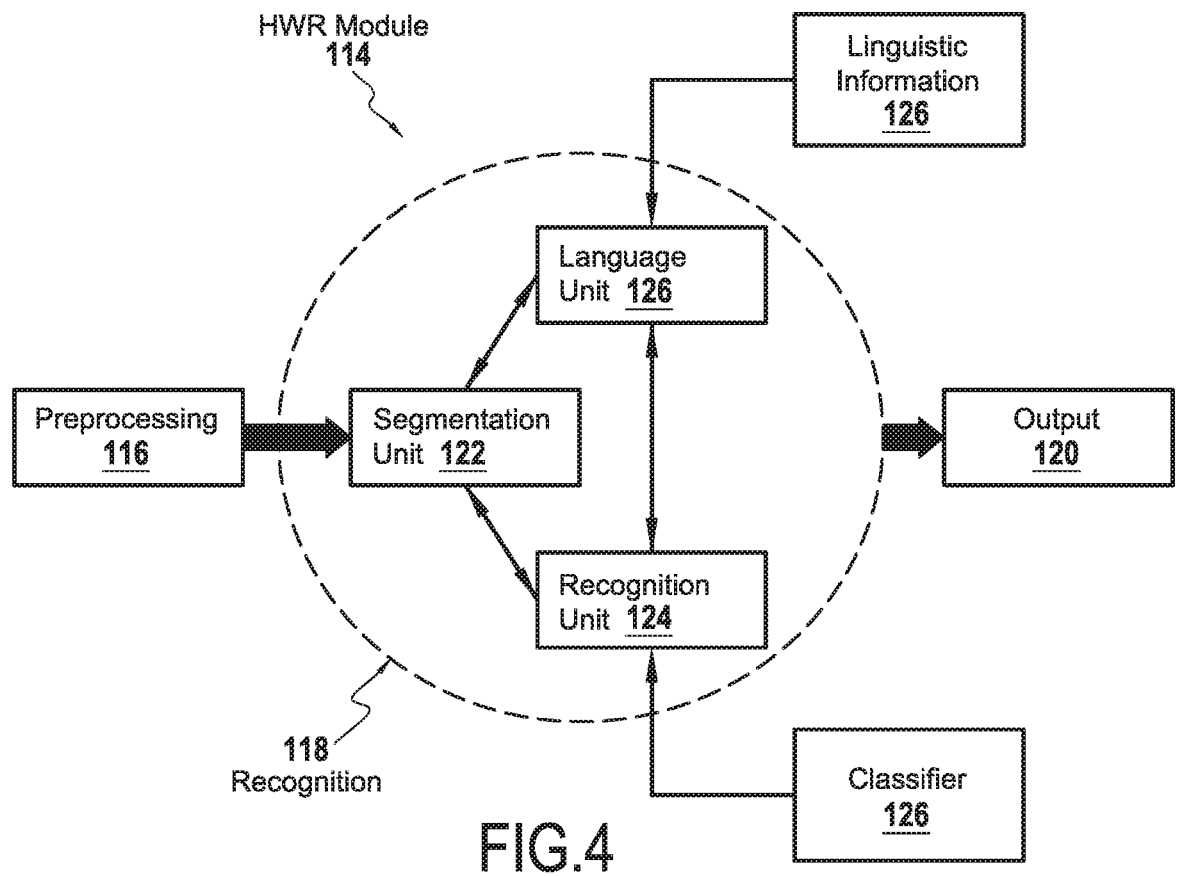

As depicted in FIG. 4 in accordance with a particular embodiment, the recognition 118 may include different processing units and corresponding steps. In particular, recognition 118 may be performed by a segmentation unit 122, a recognition unit 124 and a language unit 126 of the HWR module 114. Some aspects of these units are described herebelow to facilitate understanding of the present invention. However, no further detail is provided to avoid unnecessarily obscuring the present disclosure. An example of implementing handwriting recognition can for instance be found in US patent application No 2017/0109578 A1.

The segmentation unit 118 may define the different ways to segment the input strokes into individual element hypotheses, e.g. alphanumeric characters, mathematical operators, text characters, individual shapes, sub-expression, in order to form expressions, e.g. words, mathematical equations, or groups of shapes. For example, the segmentation unit 118 may form the element hypotheses by grouping consecutive strokes of the original input to obtain a segmentation graph where each node corresponds to at least one element hypothesis and where adjacency constraints between elements are handled by the node connections.

The recognition unit 124 performs classification of the features extracted by a classifier 128 and outputs a list of element candidates with probabilities or recognition scores for each node of the segmentation graph. Many types of classifiers known to the skilled person can be used to address the recognition task. The classifier may classify each input element as text or non-text.

The language unit 126 generates linguistic meaning for the different paths in the segmentation graph using language models (e.g., grammar or semantics). The language unit 126 checks the candidates suggested by the units 122 and 124 based on linguistic information 130. The linguistic information 130 can include a lexicon(s), such as text-based lexicons (regular expressions, etc.) and/or shape-based lexicons. The language unit 130 aims at finding the best recognition path. In addition to the lexicon constraint, the language unit 126 may use statistical information modeling for how frequent a given sequence of elements appears in the specified language or is used by a specific user to evaluate the likelihood of the interpretation of a given path of the segmentation graph.

The handwriting application 112 allows generating handwritten or hand-drawn content (e.g., diagrams, charts, shapes, drawings, or any kind of text and/or non-text) in digital ink form and have this content faithfully recognized using the HWR module 114.

Figure 5:
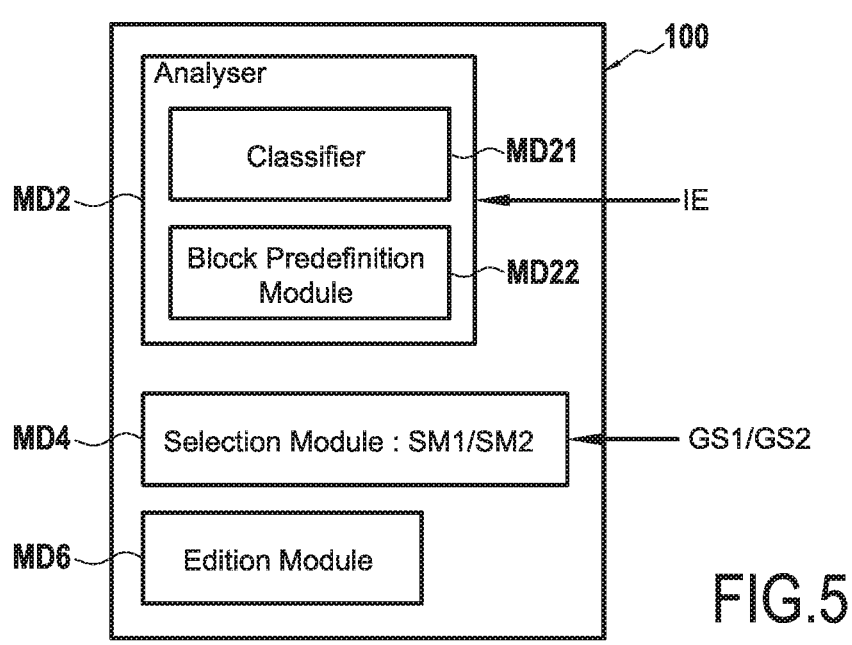
FIG. 5 is a block diagram representing schematically modules implemented by the computing device of FIG. 2, according to a particular embodiment of the invention.

In the present embodiment, when running the application 112 stored in the memory 108, the processor 106 implements a number of processing modules as depicted in FIG. 5, that is: an analyzer (or analyzing module) MD2, a selection module MD4 and an edition module MD6. The application 112 comprises instructions configuring the processor to implement these modules in order to perform steps of a method of the invention, as described later in particular embodiments.

The analyzer MD2 comprises a classifier (or classifying module) MD21 and a block predefinition module MD22. In the present example, the analyzer MD2 is performed by the HWR module 114 shown in FIG. 2, although other implementations are possible.

More specifically, the classifier MD21 is configured to classify input digital ink (i.e. handwriting digital ink) as text or non-text. To this end, the classifier MD21 performs a disambiguation process to distinguish text from non-text content in the input digital ink entered by the user. The disambiguation process may be performed by any manner known to the skilled person. An exemplary implementation is described in U.S. Patent Application Publication No. 2017/0109578 A1.

As an example of disambiguation process, the classier MD21 may group strokes using spatial and temporal considerations to build hypotheses of which strokes may belong to non-text or text elements. The spatial considerations may include distance between strokes, geometry of the strokes, overlapping of the strokes, relative positions of the strokes. The temporal considerations may include the time order of stroke input. Probability score may be calculated such that only hypotheses with a sufficiently high score are retained. Features for each group of strokes are then extracted in consideration of shape and text language models, which may be those implemented at the recognition stage 118 or separately provided as part of the preprocessing stage 116, as previously discussed (FIGS. 3-4). The features may include separation distances, changes in direction within strokes, overlap, direction of stroke pattern, curvature . . . . The strokes are then classified by the classier MD21 into text and non-text by testing hypotheses based on all of the collected information, including extracted features of the group of strokes within those hypotheses and the spatial and temporal information of the strokes within those groups. As already mentioned, other techniques of non-text/text differentiation may however be contemplated.

Once the disambiguation process is completed, the classification results may then be parsed by the HWR module 112 for handwriting recognition of the strokes (in this example, by the recognition unit 124 as shown in FIG. 4). In the present embodiment, the invention however may be implemented even if no handwriting recognition is performed.

The block predefinition module MD22 (FIG. 5) is configured to predefine blocks, each block being formed of either one or more text input elements, or one or more non-text input elements. As already mentioned, each input element is classified as text or non-text by the classifier MD21. In a particular example, the predefined blocks may also be of the mixed-type, i.e. comprising text and non-text input elements, for instance a shape (a rectangle, ellipse, etc.) which forms a container in which text is contained.

These predefined blocks are generated so that they can be selected and then manipulated or edited by a user using the computing device 100, through the input surface 104 and/or any other suitable user interface of the computing device 100.

Further, the selection module MD4 is operable to function according to the following selection modes to cause selection of at least one input element: a first selection mode SM1 triggered by a first gesture GS1 with (or on) the input surface 104 to select a predefined block; and a second selection mode SM2 triggered by a second gesture GS2, different from the first gesture GS1, with (or on) the input surface 104 to define a selection area, causing selection of each input element contained at least partially within said selection area irrespective of the blocks predefined by the analyzer MD2.

In other terms, the selection modes SM1 and SM2 are two different selection modes applicable by the selection module MD4, in response to a user command based on a selection gesture performed with the input surface 104. The selection module MD4 may apply either the selection mode SM1 or the selection mode SM2 as a function of which gesture is performed by the user.

As described later in particular embodiments, an indication that one or more input elements are being selected may be provided by the computing device 100, for instant in visual form on the display device 102 or any suitable manner.

Once selection is made, editing upon the selected one or more input elements can be performed. As described further below, various forms of editing may be performed, including: rescaling to resize all or part of one or more selected (text and/or non-text) input elements; text reflow on one or more selected text input elements; and moving, without rescaling, one or more selected (text and/or non-text) input elements.

The edition module MD6 is configured to edit the at least one selected input element selected (i.e. the one or more input elements selected by the selection module MD4) in a different manner depending on whether the first selection mode SM1 or the second selection mode SM2 is used.

According to a first variant described further below, the edition module MD6 is configured such that: (a) if a block containing text is selected using the first selection mode SM1, the edition module MD6 performs text reflow upon detection that said block is rescaled during a first edition operation; and (b) if at least one input element containing text is selected using the second selection mode SM2, and in the case said at least one input element comprises either a sub-part only of a predefined block or multiple predefined blocks, the edition module MD6, upon detection that said at least one input element is rescaled during a second edition operation, moves without rescaling each text element of said at least one input element.

In a particular example of this first variant, if a block containing non-text is selected using the first selection mode SM1, the edition module MD6 performs rescaling on said non-text upon detection that said block is rescaled (or resized).

In a particular example of this first variant, in case (b), if the selected input elements contain text and non-text, the edition module MD6 is configured, upon detection that the input elements are rescaled during a second edition operation, to rescale each non-text input element while moving without rescaling each text element.

In other words, reflow is performed on text if the first selection mode SM1 is used whereas moving without rescaling is performed on text if the second selection mode SM2 is used provided. As discussed further below, various implementations can be contemplated. The editing function of reflow will be described later in particular embodiments.

In a particular example of this first variant, in the case the second selection mode MD2 is used, moving without rescaling is performed on text only if the at least one selected input element comprises either a sub-part only of a predefined block (i.e. a sub-part of one or plural predefined blocks) or multiple predefined blocks, whereas reflow is performed on text if the at least one selected input element corresponds exactly to one predefined block.

In the present document, a "sub-part only" of a predefined block should be understood as an incomplete part (or incomplete portion) of such a block. A sub-part may represent for instance N–1 strokes of the N strokes forming collectively one given block (N being an integer of 2 or more).

In the embodiments considered herein, when applying the second selection mode MD2, the selection module MD4 is configured to select at least one ink stroke, wherein each stroke is selected as a whole. In other words, the selection module MD4 is not able to dissect (or divide) a stroke such that a first part of a stroke is selected while another part is excluded from the selection.

As an alternative embodiment, the selection module MD4 may however be configured to select at least one ink stroke, wherein each stroke may be selected in all or part. In other words, the selection module MD4 is then able to dissect (or divide) a stroke such that a first part of a stroke is selected while another part is excluded from the selection.

The configuration and operation of the modules MD2-MD6 of the computing device 100 will be more apparent in the particular embodiments described hereinbelow with reference to the figures. It is to be understood that the modules MD2-MD6 as shown in FIG. 5 represent only an example embodiment of the present invention, other implementations being possible.

For each step of the method of the present invention, the computing device may comprise a corresponding module configured to perform said step. At least two of these steps may be performed as part of a single module.

A method implemented by the computing device 100 illustrated in FIGS. 2-5 is now described with reference to FIGS. 6-16, in accordance with a first variant of the present invention. More specifically, the computing device 100 implements this method by executing the application 1112 stored in the memory 108.

An example scenario is contemplated where a user enters handwriting input elements on the computing device 100 and then wishes to perform some editing on these input elements.

More specifically, in a detecting step S20, the computing device 100 detects input elements IE hand-drawn (or hand-written) by a user on the input surface 104. The handwriting input elements IE may include text, non-text or a combination thereof. To this end, the computing device 100 may operate in a writing mode which allows a user to enter manually input elements using the input surface 104.

In the present example, handwriting input is made in free-mode, i.e. in a document (e.g. a blank area or the like) which is free of any physical guidelines (also called "base lines") so that no constraint of size or orientation is imposed on the user. Without any constraint of lines to follow or of input size to comply with, the user is allowed to handwrite or hand-drawn content in free and easy manner.

The computing device 100 then displays (S22) the input elements IE (all or part thereof) in digital ink on the display device 102. Each input element IE is formed by one or plural strokes of digital ink. Display of the input elements IE may be performed in real-time to provide useful feedback to the user while handwriting on the input surface 104.

Figure 7:
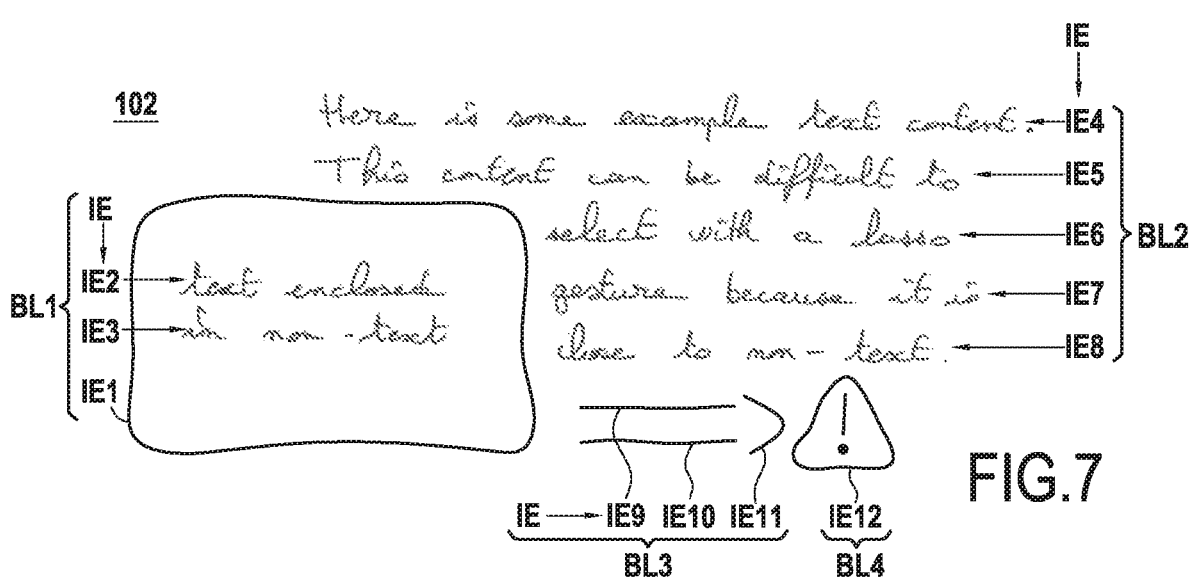
FIGS. 7-16 are schematic representations of the operation of the computing device of FIG. 2, in accordance with particular embodiments of the present invention.

As shown in FIG. 7, it is considered in the present example that the computing device 100 detects (S20) and displays (S22) various input elements IE1-IE12, referred to collectively as IE, including text and non-text content.

In a classifying step S24, the analyzer MD2 of the computing device 100 classifies input digital ink of the input elements as text or non-text by performing a disambiguation process as previously described.

As shown in FIG. 7, it is considered in this example that the user's handwriting input includes: text input elements IE2 and IE3 contained in a roughly rectangular shape (non-text) IE1 which serves as a container of text input elements IE2 and IE3; several lines of text IE4-IE8, each line constituting a text input element; shapes IE9, IE10 and IE11 constituting non-text input elements which form collectively an arrow; and a non-text symbol E12 which takes the form of an exclamation point within a triangular shape.

It should be noted that an input element within the meaning of the present invention may encompass various types of content, depending on the implementation at hand. In this example, each line of text constitutes a text input element that may be displayed, selected and managed by the computing device 100. Each of these lines comprises one or plural words, each comprising one or plural letters. Other definitions of input elements within the meaning of the present invention are however possible. Alternatively, each letter or each word may constitute as such an input element for instance.

In a block-predefining step S25, the analyzer MD2 predefines blocks (or groups) BL, each block comprising one or a plurality of input elements classified (S24) as text or non-text. Each block may be formed of either one or more text input elements IE, or one or more non-text input elements IE. In a particular embodiment, each predefined block BL may also be of the mixed-type, i.e. comprising text and non-text input elements IE.

The computing device 100 performs a predefining step S25 in the sense that it defines the blocks BL before performing the forthcoming steps S26 and S34 of input element selection and editing, respectively.

As shown in the example of FIG. 7, the analyzer MD2 predefines (S25) the following blocks BL1-BL4 referred to collectively as blocks BL:

block BL1 comprising input elements IE1-IE3;
block BL2 comprising input elements IE4-IE8;
block BL3 comprising input elements IE9-IE11; and
block BL4 comprising input element E12.

As will be seen hereafter, each block is selectable by the user in a particular manner to perform editing operations thereon.

The way the analyzer MD2 performs the predefinition S25 of the various blocks based on the input elements detected in detecting step S20 may be adapted by the skilled person depending on each case. Each block may form a coherent content that the user is likely to desire to manipulate as a whole. In the present example, the analyzer MD2 identifies for instance the non-text input element IE2 as a container which contains text input elements IE2-IE3. Thus, the analyzer MD2 predefines the container IE1 and the content within IE2-IE3 as a single selectable block BL. The analyzer MD2 also defines as a single block BL2 the text lines IE4-IE8 forming together a paragraph. The non-text input elements IE9-IE11 are recognized as forming an arrow and are thus grouped as a single block BL3.

In a particular embodiment, the block predefinition step S25 is performed such that each predefined block BL comprises one or plural input elements IE each of the same type, i.e. either text or non-text, although other implementations are possible.

As can be seen in FIG. 7, the text input elements IE4-IE8 extend in the vicinity of, and around part of, the box IE1 containing text input elements IE2 and IE3. Given the peculiar free-mode style arrangement of the text input elements I4-I8 in the vicinity of bow IE1, it may be difficult for the user to make an accurate selection of one or more input elements IE that may require editing. As already described with reference to FIG. 5, two different selection modes may be applied to allow a user to make an easy and accurate selection of one or more input elements for the purpose of editing.

In a selection step S26 (FIG. 6), the computing device 100 selects one or plural input elements IE in response to a selection command input by the user by means of a particular gesture with the input surface 104. As already described, the selection S26 may be performed according to any one of the following operable selection modes: the first selection mode SM1, and the second selection mode SM2.

The selection modes SM1 and SM2 are two different selection modes applicable by the computing device 100, in response to a respective user command, i.e. a selection gesture performed with (or on) the input surface 104.

Figure 6:
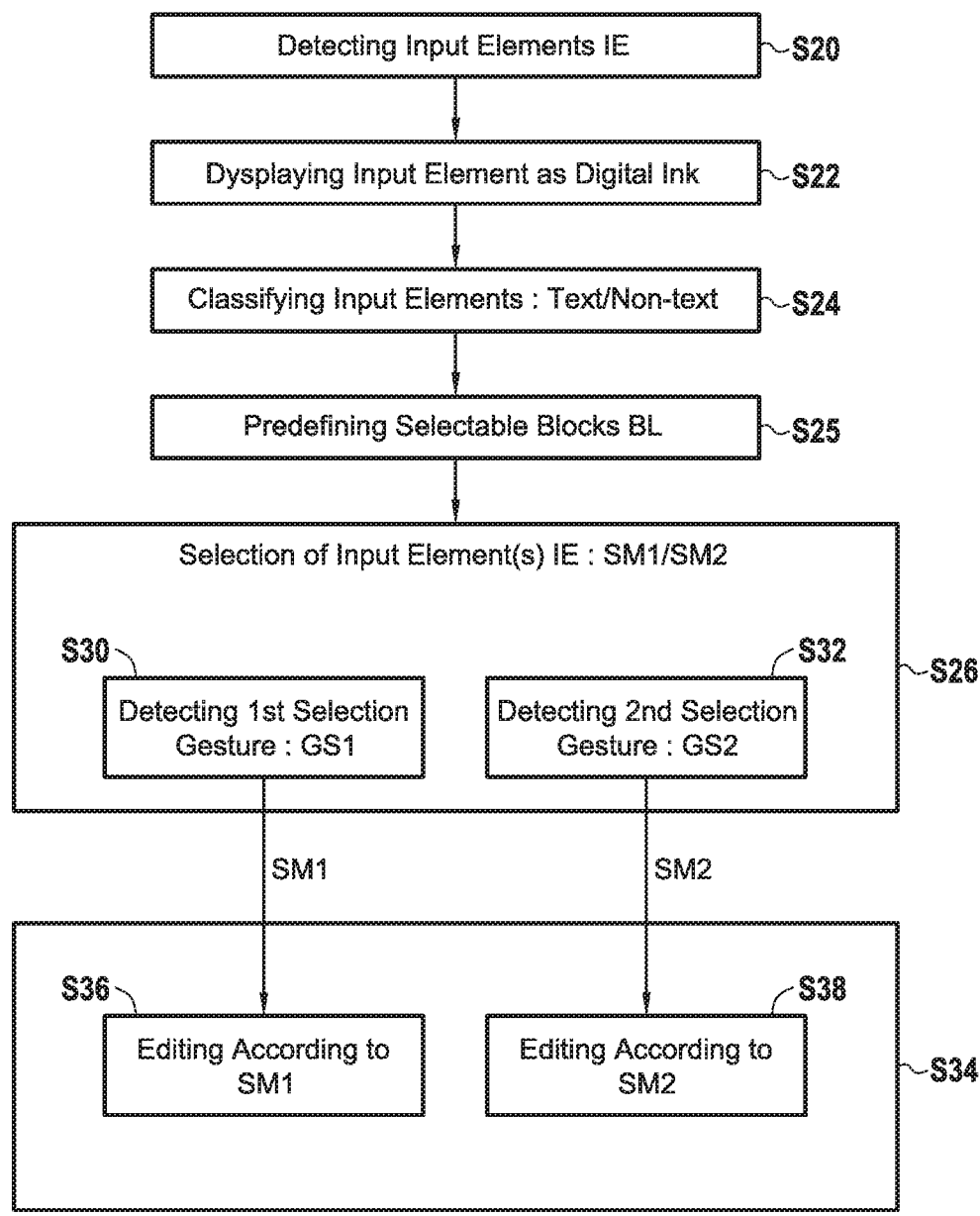
FIG. 6 is of flow diagram representing schematically steps of a method according to a particular embodiment of the present invention.

As shown in FIG. 6, in the selection step S26, the computing device 100 selects at least one input element IE according to either the first selection mode SM1 or the second selection mode SM2, such that: the first selection mode SM1 is triggered (S30) by a first gesture GS1 with the input surface 104 to select a predefined block BL; and the second selection mode SM2 is triggered (S32) by a second gesture GS2, different from the first gesture, with the input surface 104 to define a selection area, causing selection of each input element IE contained at least partially within said selection area irrespective of the blocks predefined by the analyzer.

In other words, if such a first gesture GS1 is detected, the computing device 100 performs the selecting step S26 according to the first selection mode SM1 and if such a second gesture GS2 is detected, the computing device 100 performs the selecting step S26 according to the second selection mode SM2.

Figure 8:
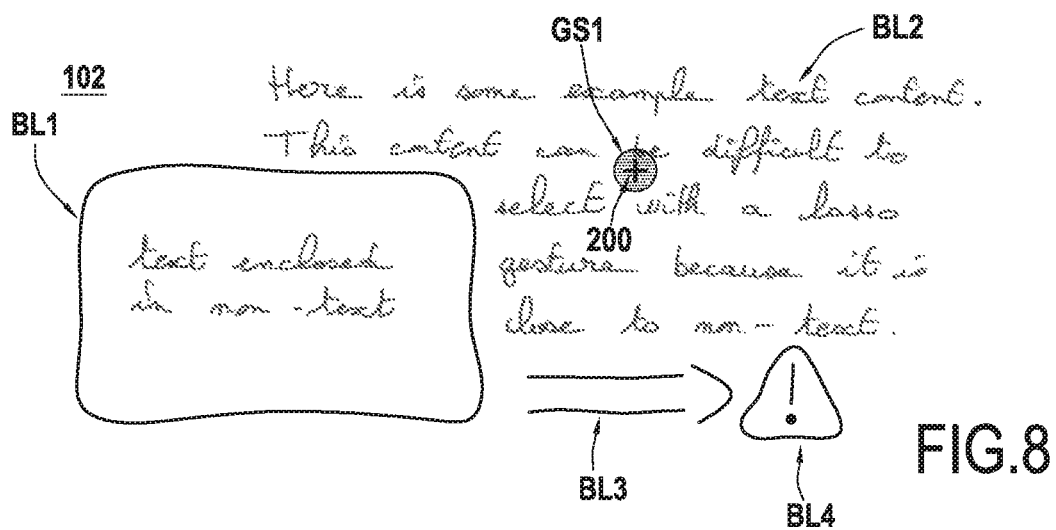

More precisely, FIG. 8 shows a particular example where the computing device 100 detects (S30) a first gesture GS1 with the input surface 104. Upon detection of this first gesture GS1, the computing device 100 determines that selection of a predefined block BL (i.e. block BL2) according to the first selection mode SM1 is being made.

In the example of FIG. 8, the first gesture GS1 is a tap-gesture on the input surface 104. The skilled person may however contemplate other implementations where other forms of gesture GS1 are used.

In the present embodiment, the tap-gesture GS1 defines a selection position 200 on the display device 102. In this first selection mode SM1, the computing device 100 may select the predefined block based on the selection position 200 defined by the first gesture GS1. More particularly, in the first selection mode SM1, selection of one predefined block BL may be made based on the relative position of the selection position 200 with respect to each predefined block BL displayed on the display device 100 so that the predefined block BL closest to the selection position 200 is selected.

As shown in the example of FIG. 8, the user performs a tap-gesture GS1 at the selection position 200 to select the predefined block BL2 which is the closest block among the predefined blocks BL1-BL4.

It is considered in the present embodiment that the first gesture GS1 is designed to select a single one among the predefined blocks BL. However, as an alternative, multiple blocks BL may be selected by the first gesture GS1 or by a variant thereof (using a third gesture). For instance, the computing device 100 may select multiple blocks BL upon detection of multi-taping which allows a user to define multiple selection positions to select multiple respective blocks BL.

In the present embodiment, the first gesture GS1 is an interaction of a user's body part with the input surface 104 which is detected (S30) without causing generation of a stroke of digital ink on the display device 102. In other words, the tap-gesture made in FIG. 8 does not lead to the generation and display of any digital ink stroke on the display device 102. In a particular example, a temporary indication of the selection position 200 defined by the first gesture may be provided by the computer device 100 to the user, but without creating a digital ink stroke on the display device 102.

It should be noted that the selection according the first selection mode SM1 is configured to work at block level, to select a block BL as predefined by the computing device 100 in step S25. As a result, this first selection mode SM1 allows quick and easy selection of a predefined block BL, even when this block BL is overlapping at least partially with another block BL.

Figure 9:
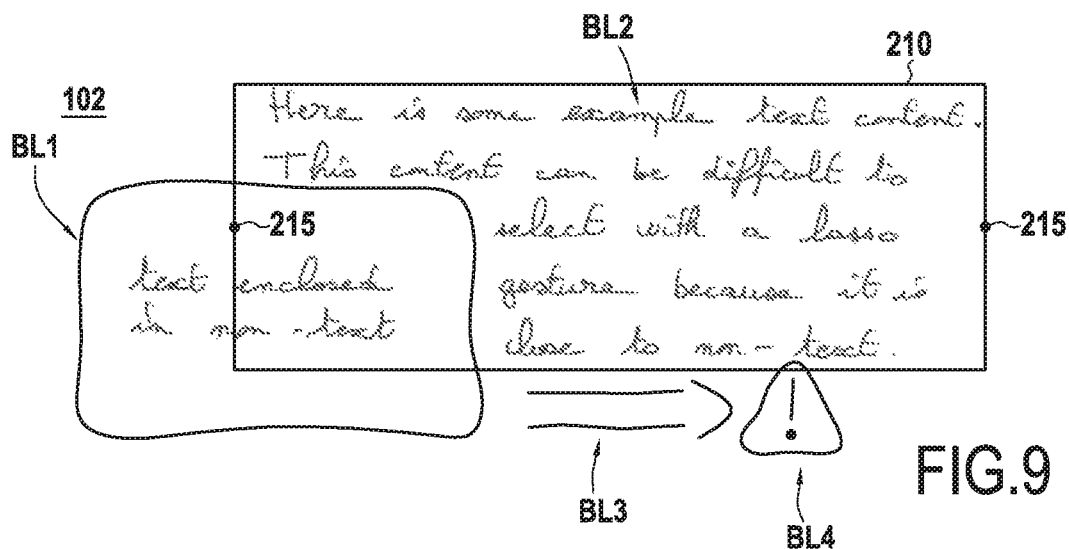

As shown in FIG. 9, a visual indication may be provided to the user on the display device 102 to show which block BL has been selected according to the first selection mode SM1. In the present example, a bounding box 210 is created around the predefined block BL2. Selection handles (also called resizing or reflow selection handles) 215 may be also created and displayed in association with (or on) the bounding box 210. The number, position, form and configuration of the selection handles may be adapted by the skilled person. These selection handles are displayed for selection to reflow the selected block BL2.

As described further below, once selection of the predefined block BL2 has been made according to the first selection mode SM1, editing (S36) of this block BL2 can be performed in a specific manner.

FIGS. 11-15 show examples were where the second selection mode SM2 is applied in the selecting step S26 (FIG. 6).

Figure 11:
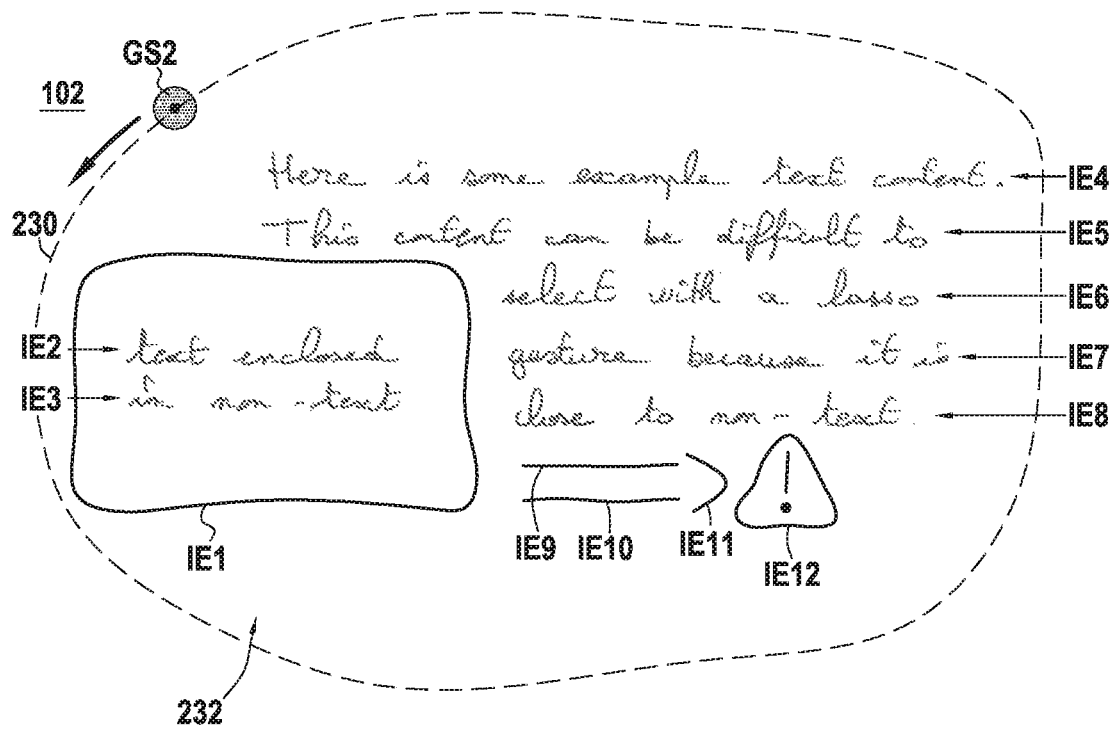

More specifically, as shown in FIG. 11, the computing device 100 detects (S32, FIG. 6) a second gesture GS2 with the input surface 104 which defines a selection area (or selection zone) 232 causing selection of each input element IE contained at least partially within the selection area 232 irrespective of the blocks BL predefined in block predefining step S25. As already indicated, this second gesture GS2 is different from the first gesture GS1, so that the computing device 100 is able to determine according to which selection mode SM1/SM2 the selection S26 is being made.

It should be noted that the selection according the second selection mode SM2 is configured to work at an input element level, to select each input element IE at least partially included in the selection area 232. As a result, the selection may include at least one input element IE of a given predefined block BL while excluding at least another input element IE of that same predefined block BL. This second selection mode SM2 allows more precise selection than the first selection mode SM2.

In the present example depicted in FIG. 11, the second gesture GS2 is a slide gesture (or free-selection gesture, or "lasso" gesture) on the input surface 104 which forms roughly a closed (or nearly closed) loop 230, such as a roughly circular or oval form or the like, or at least a geometric shape which allows the computing device 100 to deduce therefrom a selection area 232 which may contain one or more input elements IE. In response to the detection of this second gesture GS2, a visual indication may be displayed on the display device 102, thereby rendering the user with visual feedback of the detection.

In the example of FIG. 11, the computing device 100 detects that the user slides his/her finger or hand on the input surface 104 along the path 230 to define a selection area 232 which contains the input elements IE1-IE12. This gesture is recognized by the computing device 100 as a second gesture GS2 instructing selection of the input elements IE1-IE12 according to the second selection mode SM2. Thanks to this second selection mode SM2, multiple input elements IE can be easily and quickly selected.

In the present embodiment, the second selection mode SM2 is configured such that both input elements that are completely enclosed by the selection area 232 and also only partially within the selection area 232 are recognized by the computing device 100 as selected in the selecting step S32 (FIGS. 6 and 11). In a particular embodiment, an algorithm may be executed by the computing device 100, for each input element IE only partially enclosed in the selection area 223, to determine the proportion (or percentage) of the input element IE within (or conversely outside) the selection area 232 and to deduce therefrom whether the input element IE is included in the selection. For instance, a partially enclosed input element IE may be recognized as part of the selection if the relative proportion of the one or more strokes of the input element IE enclosed within the selection area 232 reaches a predetermined threshold. Alternatively, the second selection mode SM2 may be configured such that only the input elements IE which are completely enclosed by the selection area 232 are recognized as being selected.

In the present embodiment, the second selection mode SM2 is configured such that the second gesture GS2 causes generation by the computing device of a stroke of digital ink on the display device 102. In other words, a digital ink stroke is displayed along the path 230 thereby rendering the user with visual feedback of the detection. This stroke can be displayed in real-time while the user is hand-drawing the selection area 232 with the input surface 104.

The skilled person may however contemplate other implementations where other forms of gesture GS2 are used.

Figure 12:
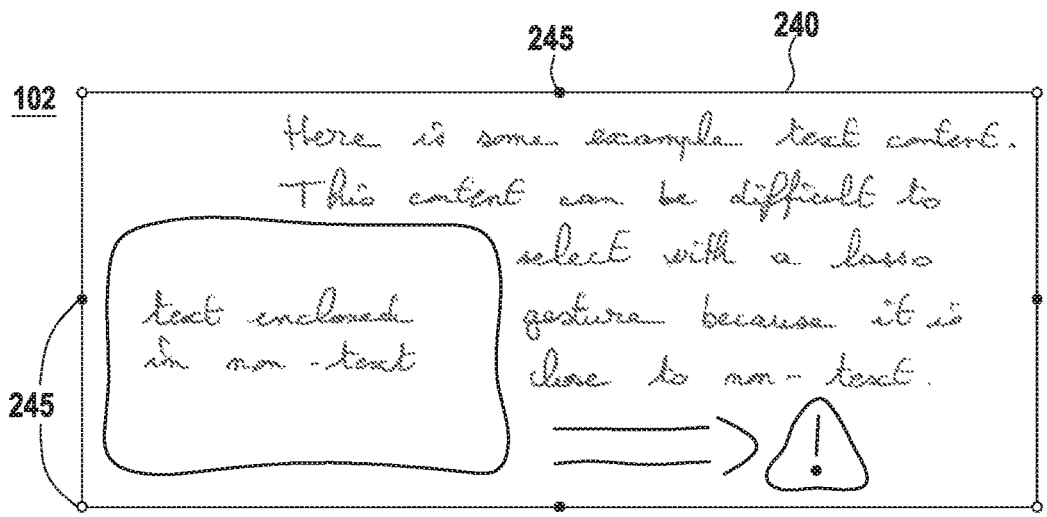

As shown in FIG. 12, a visual indication may be provided to the user on the display device 102 to show which input elements are being selected according to the second selection mode SM2. In the present example, a bounding box 240 is created around the selected input elements IE1-IE12. Selection handles (also called resizing selection handles) 245 may be also created and displayed in association with (or on) the bounding box 240. The number, form, position and configuration of the selection handles may be adapted by the skilled person. These selection handles are displayed for selection to resize as a block the selected input elements IE1-IE12.

As described further below, once selection of the input elements IE1-IE12 has been made according to the second selection mode SM2, editing (S38) of these input elements can be performed in a specific manner.

As described above, in the example shown in FIGS. 11-12, a plurality of predefined blocks BL1-BL4 are selected according to the second selection mode SM2.

Figure 13:
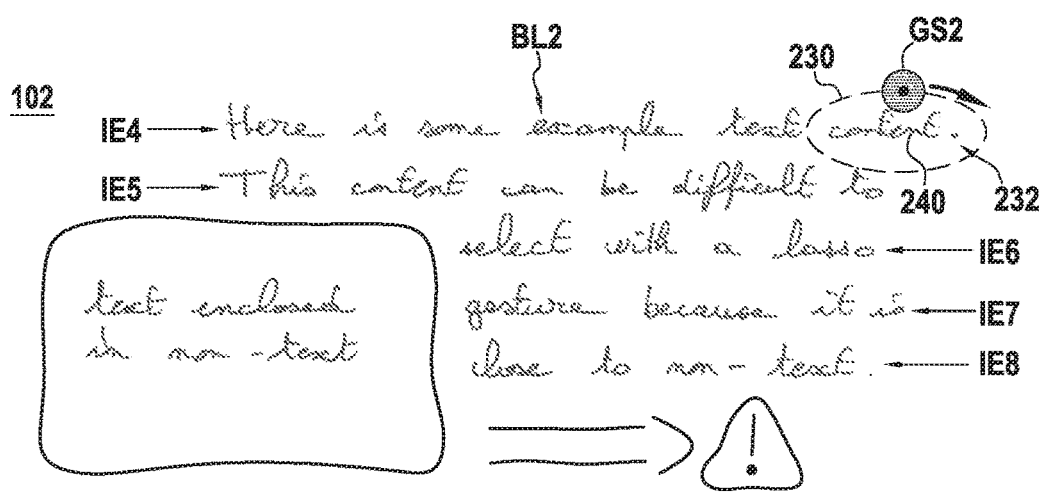

As shown in FIG. 13, selection of a sub-part only of a predetermined block BL can be achieved in accordance with the second selection mode SM2 in an analogous manner to the example of multi-selections shown in FIGS. 11-12. As already indicated, a sub-part of a predefined block (or input element, respectively) in this context is an incomplete part of a predefined block (or input element, respectively). A sub-part of a predefined block BL may be formed by one or more input elements IE or by a sub-part of one or more input elements IE, or any combination thereof.

FIG. 13 depicts an example where the computing device 100 detects a selection, according to the second selection mode SM2, of a sub-part 230 of the predefined block BL2, i.e. of a word which is sub-part of the input element IE4. Other implementations are however possible.

Figure 14:
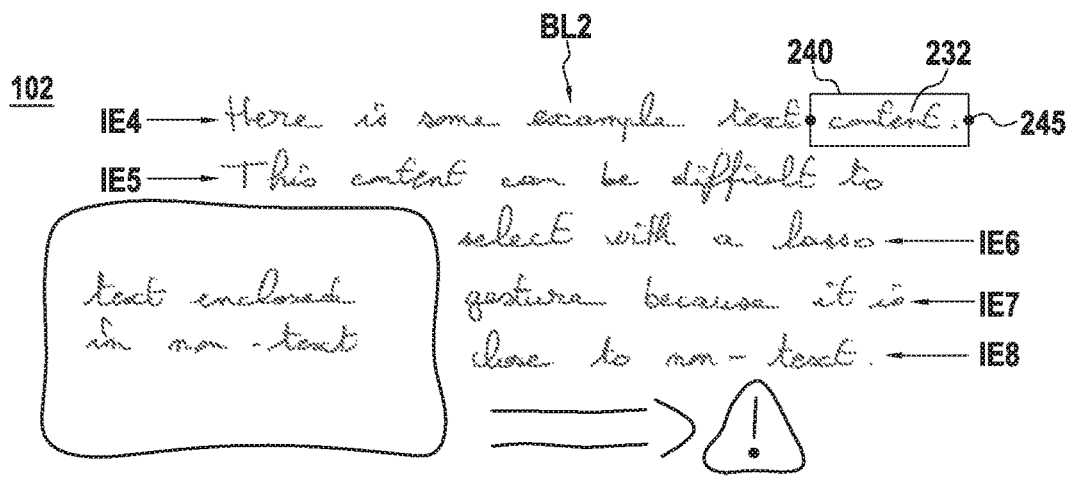

As shown in FIG. 14, a visual indication may be provided to the user on the display device 102 in the same manner as in FIG. 12. In the present example, a bounding box 240 is created around the selected sub-part 230 of input elements IE4. Selection handles (also called resizing selection handles) 245 may be also created and displayed in association with (or on) the bounding box 240. The number, form, position and configuration of the selection handles may be adapted by the skilled person. These selection handles are displayed for selection to resize the selected sub-part 245.

The selection mode SM2 allows accurate selection of any input element IE or part thereof in an easy manner, irrespective of the blocks of input elements that may be predefined by the computing device 100.

Figure 15:
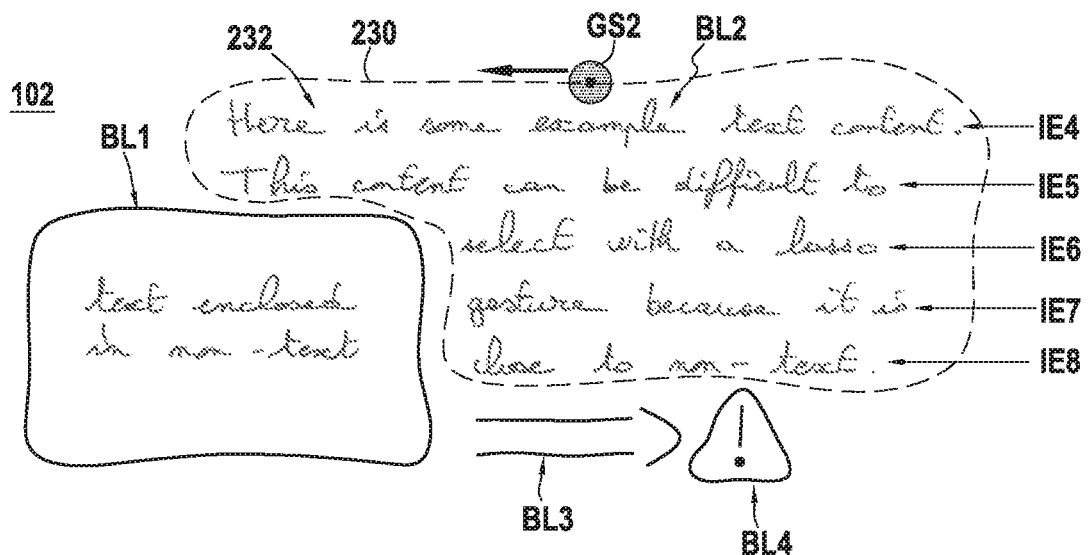

In a particular embodiment, selection of exactly one predefined block BL may also be achieved in accordance with the second selection mode SM2, by detecting a second gesture GS2 in the same manner as described earlier with reference to FIGS. 11-14. As shown in FIG. 15, the computing device 100 may for instance detect selection according to the second selection mode SM2 of the predefined block BL2 (in the case the input elements IE4-IE8 of the block BL2, and nothing more, are recognized as at least partially contained in the selection area formed by the second gesture GS2).

A visual indication may then be provided to the user on the display device 102 in the same manner as in FIG. 9 to provide user feedback that the predefined block BL2 has been selected.

In a particular embodiment, an indication is rendered by the computing device 100 to inform the user whether the first or second selection mode SM1/SM2 has been used.

Turning back to FIG. 6, once the selection S26 is made, editing (S34) upon the selected one or more input elements IE can be performed. As described above, a complete predefined block BL is selected (S30) if the first selection mode SM1 is used whereas, in case the second selection mode SM2 is used, selection (S32) can be made of a predefined block BL, a sub-part thereof, or multiple predefined blocks (in part or in all).

Various forms of editing may be performed. In the embodiments described herein, the editing S34 includes rescaling to resize all or part of the one or more selected input elements IE using either the first selection mode SM1 or the second selection mode SM2.

Rescaling one or more input elements IE can be achieved by transforming the coordinates of the points of each digital ink stroke of the one or more input elements IE according to the distance that a selection handle associated with the one or more input elements is dragged or moved.

In accordance with the present embodiment, the one or more input elements IE selected in selecting step S26 are edited in a different manner depending on whether the first selection mode SM1 or the second selection mode SM2 is used. If the first selection mode SM1 is used, editing (S36, FIG. 6) is performed according to a first configuration whereas if the second selection mode SM2 is used (S38, FIG. 6) editing is performed according to a second configuration different from the first configuration. As described later, handling differently editing of the selected input element(s) in accordance with the present invention provides flexibility and improved experience to the user.

Firstly, if a predefined block BL containing text is selected (S30, FIG. 6) using the first selection mode SM1, the computing device 100 performs text reflow (S36) upon detecting that this block is rescaled during a first edition operation.

Figure 10:
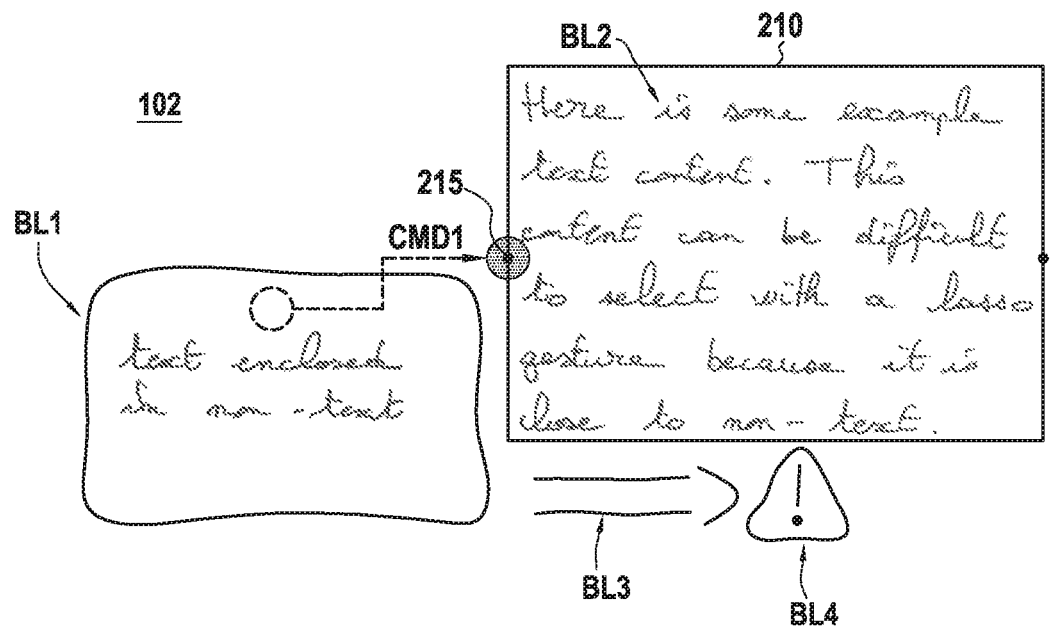

More specifically, as shown in FIG. 10, upon detecting for instance that the predefined block BL2 is being selected as described with reference to FIGS. 8-9, text reflow is performed by the computing device 100 in response to a first user command CMD1 to rescale the block BL2 (first edition operation). In other words, the text content is reflowed within the resized block BL2. In the present example, text reflow is performed in the horizontal direction although reflow in another direction is possible. As a result, the relative positions of the different digital ink strokes of the block BL2 are rearranged within said block BL2.

In the present embodiment, this first user command CMD1 triggering the editing step S36 is a user gesture according to which the user selects and drags (or moves) a selection handle 215 of the bounding box 210 present around the selected predefined block BL2. Other user gestures or user commands may however be contemplated.

Text reflow can be performed in a horizontal direction or vertical direction. In the example shown in FIG. 10, the bounding bow 210 are equipped with only selection handles 215 to perform rescaling in the horizontal direction (i.e. one selection handle 215 on the left and right side of the bounding box 210). An analogous arrangement can be made with selection handles in the vertical direction, as an alternative or in addition to the selection handles 215 shown in FIGS. 9-10.

More generally, if a block BL contains text and non-text is selected (S30) using the first selection mode SM1, then upon detection that said block is rescaled during a first edition operation, the text is reflowed while the non-text is rescaled (or resized) in the editing step S36.

In a particular embodiment, if a block BL containing non-text only is selected (S30) using the first selection mode SM1, the computing device 100 performs rescaling (resizing) on said non-text in the editing step S36, in response to a first user command CMD1 to rescale said block BL (first edition operation).

Secondly, if one or more input elements IE containing text are selected (S32, FIG. 6) using the second selection mode SM2, wherein said one or more input elements comprise either a sub-part only of a predefined block (as shown in FIGS. 13-14) or multiple predefined blocks (as shown in FIGS. 11-12), the computing device 100, upon detection that said one or more input elements IE are rescaled during a second edition operation, moves without rescaling (S38) each text element of said one or more input elements IE.

Figure 16:
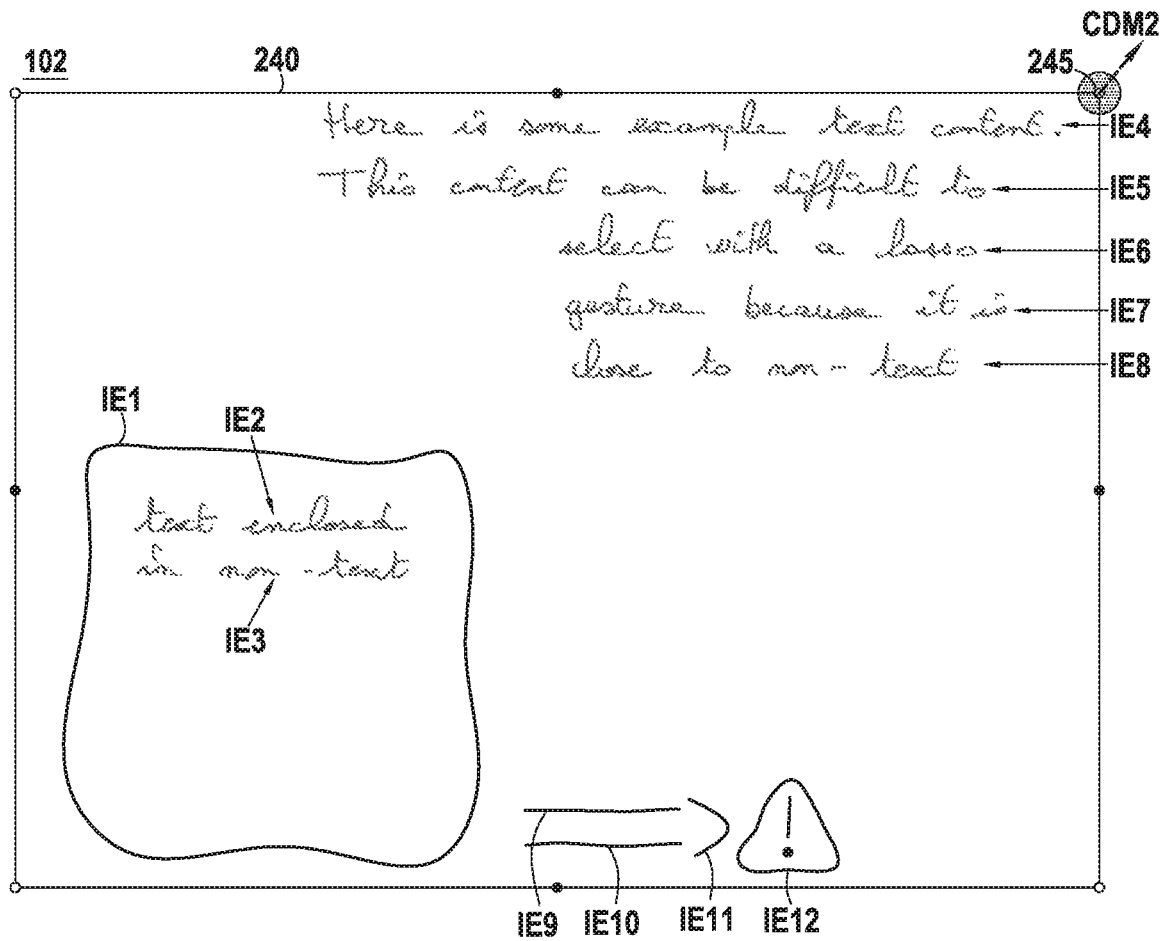

More specifically, as shown in FIG. 16, upon detecting for instance that the multiple input elements IE1-IE12 are being selected as described with reference to FIG. 11-12, the computing device 100 moves without rescaling (S38) each text element in response to a second user command CMD2 to rescale the selected input elements IE1-IE12 (second edition operation). In other words, instead of being reflowed (as in editing step S36), the text content is merely moved within the resized bounding box 240. Additionally, the non-text input elements IE1 and IE9-IE12 (if any) are also resized within the bounding box 240 upon detection of the second user command CMD2.

In the present embodiment, this second user command CMD2 triggering the editing step S38 is a user gesture according to which the user selects and drags (or moves) a selection handle 245 of the bounding box 240 present around the selected predefined input elements IE1-IE12. Other user gestures or user commands may however be contemplated.

As shown in FIG. 16, in the present example the text element IE2-IE8 are moved during editing step S38 so as to follow or keep a predetermined spatial relationship with the resize handle 245 dragged by the user. As the user commands resizing of the entire bounding box 240, the selected resize handle 245 acts as a position anchor for each text input element within said box 240.

In the present embodiment, no text-reflow is performed if selection was made through the second selection mode SM2.

In the example shown in FIGS. 11-12 and 16, the selected inputs elements IE comprise text and non-text input elements, although editing in step S38 is also possible in cases where there is no shape (or non-text) content in the selection. In such a case, the computing device 100 simply moves without rescaling each text element of the one or more selected input elements IE in response to the second user command CMD2.

In the example shown in FIGS. 11-12 and 16, the selected input elements IE1-IE12 correspond to multiple predefined blocks, i.e. BL1-BL4. Analogous editing behaviour is also performed by the computing device 100 in cases where for instance a sub-part 232 only (as shown in FIGS. 13-14) of a predefined block BL2 is being selected using the second selection mode SM2 and then undergo editing in response to a second user command CMD2 as already described with reference to FIG. 16. If rescaling is commanded by the user on a sub-part of a predefined block BL selected in the second selection mode SM2, the computing device 100 moves without rescaling each text element of the one or more selected input element IE.

In a particular example, if exactly one predefined block BL is selected in the second selection mode SM2 (as shown in FIG. 15), the computing device 100 may perform editing in the same manner as in step S36 where the first selection mode SM1 is used, i.e. the computing device 100 performs text reflow on each text input element (if any) included in the selected block BL. Other implementations may however be contemplated. A different editing behaviour of the computing device 100 is especially desired in the second selection mode SM2 in cases where either multiple predefined block BL or one or more sub-parts thereof are selected and undergo editing in response to a rescaling command.

The present invention allows selecting and editing handwriting input elements in a flexible and efficient manner on a computing device. Two different selection modes are operable to allow the user to make an easy and accurate selection of input elements that he may wish to edit. In particular, the first selection mode SM1 allows a quick and easy selection of a predefined block BL while the second selection mode SM2 allows an accurate selection of any input element IE, including a sub-part of a predefined block BL or a plurality of predefined blocks BL.

Once one or more input elements IE are being selected, editing including rescaling can be performed. In response to a rescaling command from the user, the computing device 100 may adapt the way editing is performed on the one or more selected input elements as a function of which of the first and second selection modes SM1/SM2 has been used. A user may wish to perform differently rescaling on text depending on the situation at hand.

As described earlier in the first variant, by using the first selection mode SM1, the user can trigger resizing of a predefined block BL thereby causing text reflow of any text input elements present in said predefined block BL. Text reflow allows to adapt the relative positions of text elements according to a given direction on an display device in response to a user command for rescaling. Conversely, if the user commands resizing of a sub-part of a predefined block BL or of multiple predefined blocks BL, selected with the second selection mode SM2, then the computing device 100 moves without rescaling each text input element. Editing by moving without rescaling text content allows to maintain the original geometrical configuration (dimensions, proportions . . . ) of the text content when a rescaling command is received from a user, thereby avoiding any distortion of the text content that would otherwise degrade the general appearance of the text content and reduce its intelligibility by a user.

The user can then advantageously control editing in a flexible and efficient manner to cause either text reflow or text moving depending on which selection mode he uses, thereby improving user experience.

Input element selection and editing may be carried out without the need for complex or hard to remember gestures. The user may easily remember the procedure for performing input element selection and for causing text reflow or text moving.

In the first variant described above, editing of one or more selected input elements is performed in a different manner depending on whether the first selection mode SM1 or the second selection mode SM2 is used. More particularly, text reflow is performed if the first selection mode SM1 is used whereas moving, without rescaling, is performed on each selected text input element if the second selection mode SM2 is used. However, as already mentioned, other implementations of editing in different manners as a function of the used selection mode can be contemplated in the present invention.

A method implemented by the computing device 100 illustrated in FIGS. 2-5 is now described with reference to FIG. 6, in accordance with a second variant of the present invention. More specifically, the computing device 100 implements this method by executing the application 112 stored in the memory 108.

An example scenario is contemplated where a user enters handwriting input elements on the computing device 100 and then wishes to perform some editing on these input elements. It is assumed that the computing device 100 performs the steps S20 to S26 (and S30-S32) as already described with reference to FIGS. 6-9 and 11-15.

As depicted in FIG. 6, once the selection S26 is made, editing (S34) upon the selected one or more input elements IE can be performed. As previously described, a complete predefined block BL is selected (S30) if the first selection mode SM1 is used whereas, in case the second selection mode SM2 is used, selection (S32) can be made of one or more input elements IE representing a predefined block BL, a sub-part thereof, or multiple predefined blocks (in part or in all), irrespective of the block predefinition made in step S25.

In the present embodiment, editing (S34) is performed by the computing device 100 on at least one input element IE selected using either the first or the second selection mode SM1/SM2. This editing comprises rescaling to resize all or part of the one or more selected input elements IE.

In the present embodiment, the computing device 100 executes the detecting step S30 and the editing step S36, as previously described with reference to FIGS. 6-10. Namely, upon detection (S30) of the first gesture GS1, the computing device 100 determines that selection of a predefined block BL (i.e. block BL2, FIG. 9) according to the first selection mode SM1 is being made. If a block BL containing text is selected using the first selection mode, the computing device 100 performs text reflow upon detection that the selected block is rescaled during a first edition operation. In other words, text reflow is performed in response to a first user command CMD1 to rescale the selected block BL (first edition operation). As a result, each text input element IE (i.e. IE4-IE8) within the selected block BL2 is reflowed in the horizontal direction or in any suitable direction, thereby causing the relative positions of the digital ink strokes of the text input elements of the selected block to be rearranged within the block.

Still in the present embodiment, the computing device 100 executes the detecting step S32 in the same manner as previously described with reference to FIGS. 6 and 11-15. However, editing (S38) is performed differently from what was described earlier in the first variant as depicted in FIG. 16 in case the second selection mode SM2 is used.

In this second variant, if one or more input elements IE containing text are selected (S32) using the second selection mode SM2, these one or more input elements IE comprising either a sub-part only of a predefined block or multiple predefined blocks, the computing device 100 rescales (S38) each text element of these one or more selected input elements IE upon detection that the selected one or more input elements IE are rescaled during a second edition operation.

More specifically, upon detecting for instance that the multiple input elements IE1-IE12 are being selected as described with reference to FIGS. 11-12, the computing device 100 rescales or resizes (S38) each text element in response to a second user command CMD2 to rescale the selected input elements IE1-IE12 (second edition operation). In other words, instead of being reflowed (as in editing step S36) or moved without rescaling (as in S38 according to the first variant), the text content is rescaled as a drawing (i.e. as non-text) within the resized bounding box 240 (FIG. 12). As a result, each selected input element IE (either text and/or non-text) behave in the same manner by rescaling in response to the second user command CMD2.

Analogous editing behaviour is also performed by the computing device 100 in cases where for instance a sub-part 232 only (as shown in FIGS. 13-14) of a predefined block BL2 is being selected using the second selection mode SM2 and then undergo editing (S38) in response to a second user command CMD2 as described above in the second variant. If rescaling is commanded by the user on a sub-part of a predefined block BL selected in the second selection mode SM2, the computing device 100 rescales (without reflow) each text element of the one or more selected input element IE.

In a particular example of the second variant, if exactly one predefined block BL is selected in the second selection mode SM2 (as shown in FIG. 15), the computing device 100 may perform editing in the same manner as in step S36 where the first selection mode SM1 is used, i.e. the computing device 100 performs text reflow on each text input element (if any) included in the selected block BL. Other implementations may however be contemplated. A different editing behaviour of the computing device 100 is especially desired in the second selection mode SM2 in cases where either multiple predefined blocks BL or one or more sub-parts thereof are selected and undergo editing in response to a rescaling command.

Still in this second variant, the second user command CMD2 triggering the editing step S38 may be identical to the one described earlier with respect to the first variant, that is, a user gesture according to which the user selects and drags (or moves) a selection handle 245 of the bounding box 240 present around the selected predefined input elements IE1-IE12 (FIG. 12). Other user gestures or user commands may however be contemplated.

In a particular example of this second variant, although each text input element IE selected with the second selection mode SM2 may be treated as non-text during editing, the computing device 100 may still recognize these input element IE as text content once editing has been completed. In such cases, the computing device 100 may keep in memory textual characteristics of the text content after completion of the editing, so that it can still be treated as text if necessary. Alternatively, in response to the second user command CMD2 to rescale the input elements (for instance IE1-IE12) selected using the second selection mode SM2, the computing device 100 no longer recognizes these input elements as text but recognize them as non-text once the editing has been completed. In other words, each input element IE, selected with the second selection mode SM2, which was previously recognized as text (as a result of the classifying step S24), permanently loses its textual characteristics and, from completion of the editing onwards, is treated as non-text by the computing device 100.

A method implemented by the computing device 100 illustrated in FIGS. 2-5 is now described with reference to FIG. 6, in accordance with a third variant of the present invention. More specifically, the computing device 100 implements this method by executing the application 112 stored in the memory 108.

An example scenario is contemplated where a user enters handwriting input elements on the computing device 100 and then wishes to perform some editing on these input elements. It is assumed that the computing device 100 performs the steps S20 to S26 (and S30-S32) as already described with reference to FIGS. 6-9 and 11-15 in the first and second variants. The computing device 100 also performs the editing step S36 as previously described with reference to FIGS. 6-10 in the first and second variants.

Still in the present embodiment, the computing device 100 executes the detecting step S32 in the same manner as previously described in the first and second variants with reference to FIGS. 6 and 11-15. However, editing (S38) is performed differently from what was described earlier in the first and second variants in case the second selection mode SM2 is used.

In this third variant, if one or more input elements IE are selected using the second selection mode SM2, the computing device 100 forces editing so that each input element IE within the selection is edited as non-text or, alternatively, each input element IE within the selection is edited as text. These two possible configurations allow the user to force the computing device 100 to edit input elements IE according to a content type (text or non-text) different from the one originally recognized by the classifier MD21 during the classifying step S24 (FIGS. 5-6). For instance, in response to a first user forcing command, the computing device 100 may force each input element IE (including at least one text element) selected using the second selection mode SM2 to be treated as non-text during the editing step S38. In another example, in response to a second user forcing command, the computing device 100 may force each input element IE (including at least one non-text element) selected using the second selection mode SM2 to be treated as text during the editing step S38. In a particular example, after detection S32 that a selection of at least one input element IE has been made using the second selection mode SM2, the computing device 100 requests the user (by way of a prompt, a menu or the like) whether he wishes to edit each selected input element IE as non-text, or alternatively, as text. In response to this request, the computing device 100 receives from the user a first or second user forcing command as described above.

In this third variant, once it has been recognized that each input element IE selected with the second selection mode SM2 is to be treated as text (or conversely as non-text), the computing device 100 may then perform editing S38 in the same manner as already described in the first or second variant for the recognized content type (text or non-text) according to the second selection mode SM2.

Namely, the computing device 100 may perform at least one of the following editing operation (S38):
  moving without rescaling each input element IE treated as text, like in the first variant according to the second selection mode SM2; and
  rescaling each input element treated as non-text, like in the first variant according to the second selection mode SM2.

According to this particular embodiment, assuming that the input elements IE1-IE12 are selected using the second selection mode SM2 (FIGS. 11-12), the computing device 100 may edit each selected input element IE as non-text (drawing or shape), thereby rescaling the input elements IE1-IE12 in accordance with a second user command CMD2 to rescale the selection. Alternatively, still assuming that the input elements IE1-IE12 are selected using the second selection mode SM2 (FIGS. 11-12), the computing device 100 may edit each selected input element IE as text, thereby moving without rescaling the input elements IE1-IE12 in accordance with a second user command CMD2 to rescale the selection.

Alternatively, the computing device 100 may perform at least one of the following editing operation (S38):
  performing text reflow on each input element treated as text, like in the first variant according to the first selection mode SM1; and
  rescaling each input element treated as non-text, like in the first variant according to the first selection mode SM1.

As indicated earlier, the third variant allows the user to force the computing device 100 to edit input elements IE according to a content type (text or non-text) different from the content type originally recognized by the classifier MD21 during the classifying step S24 (FIGS. 5-6). In some ambiguous or non-conclusive cases, the computing device 100 may erroneously classify one or more input elements IE as text or non-text in the classifying step S24. For instance, the classifier MD12 may face difficulties to classify some Chinese characters as text or non-text. In this third variant, the user may force the computing device 100 to edit some input elements IE as text (or alternatively as non-text) using the second selection mode SM2, regardless of the classification S24 and the block predefinition step S25 previously performed by the computing device (FIG. 6), thereby providing flexibility to the user and improving efficiency for editing handwriting input. The user may for instance force the computing device 100 to treat as text a sub-group of at least one input element IE selected within a predefined block BL using the second selection mode SM2, although this sub-group was originally classified as non-text by the classifier MD21 (or the other way around).

In a particular embodiment, upon detecting in step S32 (FIG. 6) selection of one or more input elements IE using the second selection mode SM2, the computing device 100 provides the user with at least two different choices of editing, for example by displaying a prompt, a menu or the like on the display device 102 or by any other suitable means. In a particular example, the user is offered in step S38 to choose so that editing is performed according to any one of the first, second and third variants as previously described, or among a sub-combination thereof. For instance, the user may have to decide to perform editing S38

(second selection mode SM2) according to either the first or the second variant, or alternatively, according to either the first or the third variant. In accordance with a user command received in response to a prompt, the computing device 100 may determine which editing configuration applies.

It should be noted that, in some alternative implementations, the functions noted in the block may occur out of the order noted in the figures. For example, two blocks shown in succession may, in fact, be executed substantially concurrently, or the blocks may sometimes be executed in the reverse order, or blocks may be executed in an alternative order, depending upon the functionality involved.

The present invention having been described in particular embodiments, it is clear that it is susceptible to numerous modifications and embodiments within the ability of those skilled in the art, in accordance with the scope of the appending claims. In particular, the skilled person may contemplate any and all combinations and variations of the various embodiments described in this document that fall within the scope of the appended claims.

The invention claimed is:

1. A computing device for hand-drawing elements, the computing device comprising:
   an input surface for hand-drawing input elements including text and non-text elements;
   a display device for displaying a plurality of said input elements in digital ink, each input element being formed by at least one stroke of digital ink;
   a processor; and
   a memory storing instructions that, when executed by the processor, causes the processor to function as:
   an analyzer for classifying input digital ink as text or non-text and for predefining blocks, each of at least one input element classified as text or non-text;
   a selection module operable to function according to the following selection modes to cause selection of at least one input element:
      a first selection mode triggered by a first gesture with the input surface to select a predefined block; and
      a second selection mode triggered by a second gesture, different from the first gesture, with the input surface to define a selection area, causing selection of each input element contained at least partially within said selection area irrespective of the blocks predefined by the analyzer; and
   an edition module for editing the at least one selected input element in a different manner depending on whether the first selection mode or the second selection mode is used,
   wherein:
      if a block containing text is selected using the first selection mode, the edition module is configured to perform text reflow upon detection that said block is rescaled during a first edition operation; and
      if at least one input element containing text is selected using the second selection mode, said at least one input element comprising either a sub-part only of a predefined block or multiple predefined blocks, the edition module is then configured, upon detection that said at least one input element is rescaled during a second edition operation, to move without rescaling each text element of said at least one input element.

2. The computing device of claim 1,
   wherein the first gesture defines a selection position on the display device, and
   wherein in the first mode selection, the selection module is configured to select said predefined block based on the selection position defined by the first gesture.

3. The computing device of claim 2, wherein in the first mode selection, selection of at least one predefined block is made based on the relative position of the selection position with respect to each predefined block displayed on the display device so that the predefined block closest to the selection position is selected.

4. The computing device of claim 1, wherein the first gesture is a tap gesture detected on the input surface.

5. The computing device of claim 1, wherein in the first selection mode, the first gesture is an interaction of a user's body part with the input surface which is detected without causing generation of a stroke of digital ink on the display device.

6. The computing device of claim 1, wherein in the second selection mode, the second gesture causes generation of a stroke of digital ink on the display device.

7. The computing device of claim 1, wherein if at least one input element containing text is selected using the second selection mode, said at least one input element comprising either a sub-part only of a predefined block or multiple predefined blocks, the edition module is then configured, upon detection that said at least one input element is rescaled during the second edition operation, to rescale each non-text input element while moving without rescaling each text element of said at least one input element.

8. The computing device of claim 1, wherein if at least one input element is selected using the second selection mode, the edition module is configured to force editing so that each input element is edited as text or so that each input element is edited as non-text.

9. A method for hand-drawing elements implemented on a computing device, the computing device comprising a processor, a memory, and at least one non-transitory computer readable medium for recognizing input under control of the processor, the method comprising:
   detecting input elements hand-drawn on an input surface, said input elements including text and non-text elements;
   displaying on a display device a plurality of said input elements in digital ink, each input element being formed by at least one stroke of digital ink;
   classifying input digital ink as text or non-text, and predefining blocks of at least one input element classified as text or non-text;
   receiving a first gesture with the input surface, wherein the first gesture causes a predefined block to be selected, wherein the selected predefined block contains text and is rescaled during a first edition operation, and wherein text reflow is performed in response to rescaling the selected predefined block; and
   receiving a second gesture, different from the first gesture, with the input surface to define a selection area, wherein the second gesture causes selection of each input element contained at least partially within the selection area irrespective of the predefined blocks, wherein at least one input element contains text, wherein the at least one input element comprises either a sub-part only of a predefined block or multiple predefined blocks, wherein the at least one input element is rescaled during a second edition operation, and wherein each text element of the at least one input element is moved without rescaling in response to rescaling of the at least one input element.

10. The method of claim 9, wherein the at least one input element selected using the second gesture causes each input element to be edited as text or edited as non-text.

11. A non-transitory computer readable medium having a computer readable program code embodied therein, said computer readable program code adapted to be executed to implement a method for hand-drawing elements implemented on a computing device, the computing device comprising a processor, a memory and at least one non-transitory computer readable medium for recognizing input under control of the processor, the method comprising:
- detecting input elements hand-drawn on an input surface, said input elements including text and non-text elements;
- displaying on a display device a plurality of said input elements in digital ink, each input element being formed by at least one stroke of digital ink;
- classifying input digital ink as text or non-text, and predefining blocks of at least one input element classified as text or non-text;
- selecting at least one input element according to the following operable selection modes:
  - a first selection mode triggered by a first gesture with the input surface to select a predefined block; and
  - a second selection mode triggered by a second gesture, different from the first gesture, with the input surface to define a selection area, causing selection of each input element contained at least partially within said selection area irrespective of the predefined blocks;
- editing the at least one selected input element in a different manner depending on whether the first selection mode or the second selection mode is used,
wherein said editing comprises:
  - if a block containing text is selected using the first selection mode, performing text reflow upon detection that said block is rescaled during a first edition operation; and
  - if at least one input element containing text is selected using the second selection mode, said at least one input element comprising either a sub-part only of a predefined block or multiple predefined blocks, rescaling each text element of said at least one input element upon detection that said at least one input element is rescaled during a second edition operation.

* * * * *